US011131443B2

(12) United States Patent
Lehman et al.

(10) Patent No.: US 11,131,443 B2
(45) Date of Patent: Sep. 28, 2021

(54) HORIZONTAL LIGHT GUIDE BASED LIGHTING FIXTURE

(71) Applicant: SIGNIFY HOLDING B.V., Eindhoven (NL)

(72) Inventors: Gregg Arthur Lehman, Peachtree City, GA (US); Paul Wayne Lewis, Sharpsburg, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 95 days.

(21) Appl. No.: 16/363,848

(22) Filed: Mar. 25, 2019

(65) Prior Publication Data

US 2019/0285255 A1  Sep. 19, 2019

Related U.S. Application Data

(63) Continuation of application No. 14/970,339, filed on Dec. 15, 2015, now Pat. No. 10,240,760.
(Continued)

(51) Int. Cl.
*F21V 15/015* (2006.01)
*F21V 21/02* (2006.01)
(Continued)

(52) U.S. Cl.
CPC .............. *F21V 21/02* (2013.01); *F21S 8/00* (2013.01); *F21V 15/015* (2013.01); *F21V 17/10* (2013.01); *F21V 19/001* (2013.01); *G02B 6/0086* (2013.01); *F21S 2/00* (2013.01); *F21V 21/005* (2013.01); *F21V 23/0471* (2013.01); *F21Y 2103/10* (2016.08); *F21Y 2115/10* (2016.08); *G02B 6/0088* (2013.01)

(58) Field of Classification Search
CPC .................. G02B 6/0093; F21V 2200/20
See application file for complete search history.

(56) References Cited

U.S. PATENT DOCUMENTS 7,681,347 B1    3/2010 Welker et al.
2010/0254121 A1*  10/2010 Zhou .................... G02B 6/0055
                                                   362/147
(Continued)

FOREIGN PATENT DOCUMENTS

RU         126196 U1    3/2013

OTHER PUBLICATIONS

International Search Report for PCT/US2016/039258 dated Oct. 27, 2016.

*Primary Examiner* — Julie A Bannan

(57) ABSTRACT

A lighting fixture includes a housing bracket and pair of side rails, each side rail located adjacent opposite sides of the housing bracket. Further, the lighting fixture includes a light guide that is oriented horizontally and securely retained by the pair of side rails. Furthermore, the lighting fixture includes a plurality of light sources that are disposed on or within a cavity defined by at least one of the side rails such that the plurality of light sources are positioned in close proximity to and along an edge of the light guide. The light guide receives light emitted by the plurality of light sources through the edge of the light guide and emits the light through a major surface of the light guide. Further, the lighting fixture includes an end plate and an end cap disposed on each lateral end of the lighting fixture.

19 Claims, 31 Drawing Sheets

Related U.S. Application Data

(60) Provisional application No. 62/188,147, filed on Jul. 2, 2015.

(51) Int. Cl.

| | | |
|---|---|---|
| *F21S 8/00* | (2006.01) | |
| *F21V 17/10* | (2006.01) | |
| *F21V 19/00* | (2006.01) | |
| *F21V 8/00* | (2006.01) | |
| F21Y 103/10 | (2016.01) | |
| F21Y 115/10 | (2016.01) | |
| F21S 2/00 | (2016.01) | |
| F21V 21/005 | (2006.01) | |
| F21V 23/04 | (2006.01) | |

(56) References Cited

U.S. PATENT DOCUMENTS

| | | | | |
|---|---|---|---|---|
| 2011/0051402 A1* | 3/2011 | Keller | ............... | F21S 8/06 |
| | | | | 362/147 |
| 2012/0257383 A1* | 10/2012 | Zhang | ............... | F21S 2/005 |
| | | | | 362/235 |
| 2012/0306377 A1* | 12/2012 | Igaki | ............... | F21V 23/0471 |
| | | | | 315/151 |
| 2013/0308325 A1 | 11/2013 | Verfuerth et al. | | |
| 2014/0313776 A1* | 10/2014 | Grigore | ............... | G02B 6/0078 |
| | | | | 362/612 |
| 2014/0355297 A1 | 12/2014 | Castillo et al. | | |

\* cited by examiner

HORIZONTAL LIGHT GUIDE BASED LIGHTING FIXTURE

CROSS REFERENCE TO RELATED APPLICATIONS

This application is a continuation application of and claims priority to U.S. patent application Ser. No. 14/970,339, titled "Horizontal Light Guide Based Lighting Fixture, and filed on Dec. 15, 2015, which application claims priority under 35 U.S.C. § 119 to U.S. Provisional Patent Application No. 62/188,147, titled "Horizontal Light Guide Based Light Fixture," and filed on Jul. 2, 2015. The foregoing applications are hereby fully incorporated herein by reference.

TECHNICAL FIELD

The present disclosure relates generally to lighting fixtures, and in particular to a horizontally oriented light guide based lighting fixture.

BACKGROUND

High energy efficiency and longer lifetime have made light emitting diodes (LEDs) a predominant choice as light sources for lighting fixtures. However, in some embodiments, LED based lighting fixtures can produce non-uniform lighting and harsh glares, and they can lack precise optical control. Accordingly, an LED based lighting fixture that addresses the above-mentioned deficiencies is desirable.

SUMMARY

In one aspect, the present disclosure can relate to a lighting fixture. The lighting fixture includes an elongated housing bracket that has a middle panel, two side panels that extend substantially perpendicular from opposite ends of the middle panel, and a base bracket member that is coupled to a bottom portion of the two side panels. The middle panel, the two side panels, and the bottom bracket member may define a cavity to house one or more electronic components. Further, the lighting fixture includes a side rail positioned adjacent one side of the elongated housing bracket and another side rail positioned adjacent an opposite side of the elongated housing bracket. Furthermore, the lighting fixture includes a horizontally oriented light guide that is positioned below the elongated housing bracket. In particular, at least a portion of longitudinal edges of the light guide are securely retained by the side rail and the other side rail, respectively. In addition, the lighting fixture includes a plurality of light emitting diodes (LEDs) that are positioned on or within at least one of the side rails such that the plurality of LEDs are proximate to and directed towards a respective longitudinal edge of the light guide. The lighting fixture may also include at least one reflector that is removably coupled to the elongated housing bracket on one side of the at least one reflector and the side rail on an opposite side of the at least one reflector. In particular, the reflector may be positioned above the light guide.

In another aspect, the present disclosure can relate to a quick attachment device. The quick attachment device includes a first member that is configured to be coupled to a light engine of a lighting fixture. The light engine includes a light guide that is configured to receive light from a light source through an edge of the light guide and emit the received light through a major surface of the light guide. Further, the quick attachment device includes a second member that is configured to be coupled to a housing bracket of the lighting fixture. In particular, the first member is configured to be removably coupled to the second member in order to couple the light engine to the housing bracket of the lighting fixture such that the housing bracket is positioned above the light engine.

In yet another aspect, the present disclosure can relate to a lighting fixture. The lighting fixture includes an elongated housing bracket comprising a middle panel, two side panels that extend substantially perpendicular from opposite edges of the middle panel, and a base bracket member that is coupled to a bottom portion of the two side panels to form a component housing compartment. Further, the lighting fixture includes a hook member that comprises a hook that defines a cavity and is configured to be coupled to the elongated housing bracket. Furthermore, the lighting fixture includes a light engine that has a side rail that is positioned adjacent one side of the elongated housing bracket and another side rail that is positioned on an opposite side of the elongated housing bracket. Further, the light engine includes a horizontally oriented light guide positioned below the component housing compartment. In particular, at least a portion of opposite longitudinal edges of the light guide are securely retained by the side rail and the other side rail, respectively. Furthermore, the light engine includes a plurality of light emitting diodes (LEDs) that are positioned on or within at least one of the side rails such that the plurality of LEDs are proximate to and directed towards a respective longitudinal edge of the light guide retained by the at least one of the side rails. Furthermore, the lighting fixture includes a tab member that is configured to be coupled to the light engine and comprises a tab feature that is configured to removably engage the cavity defined by the hook of the hook member in order to removably couple the light engine to the elongated housing bracket of the lighting fixture.

These and other aspects, objects, features, and embodiments will be apparent from the following description and the appended claims.

BRIEF DESCRIPTION OF THE DRAWINGS

Reference will now be made to the accompanying figures, which are not necessarily to scale, and wherein.

Figure 1:
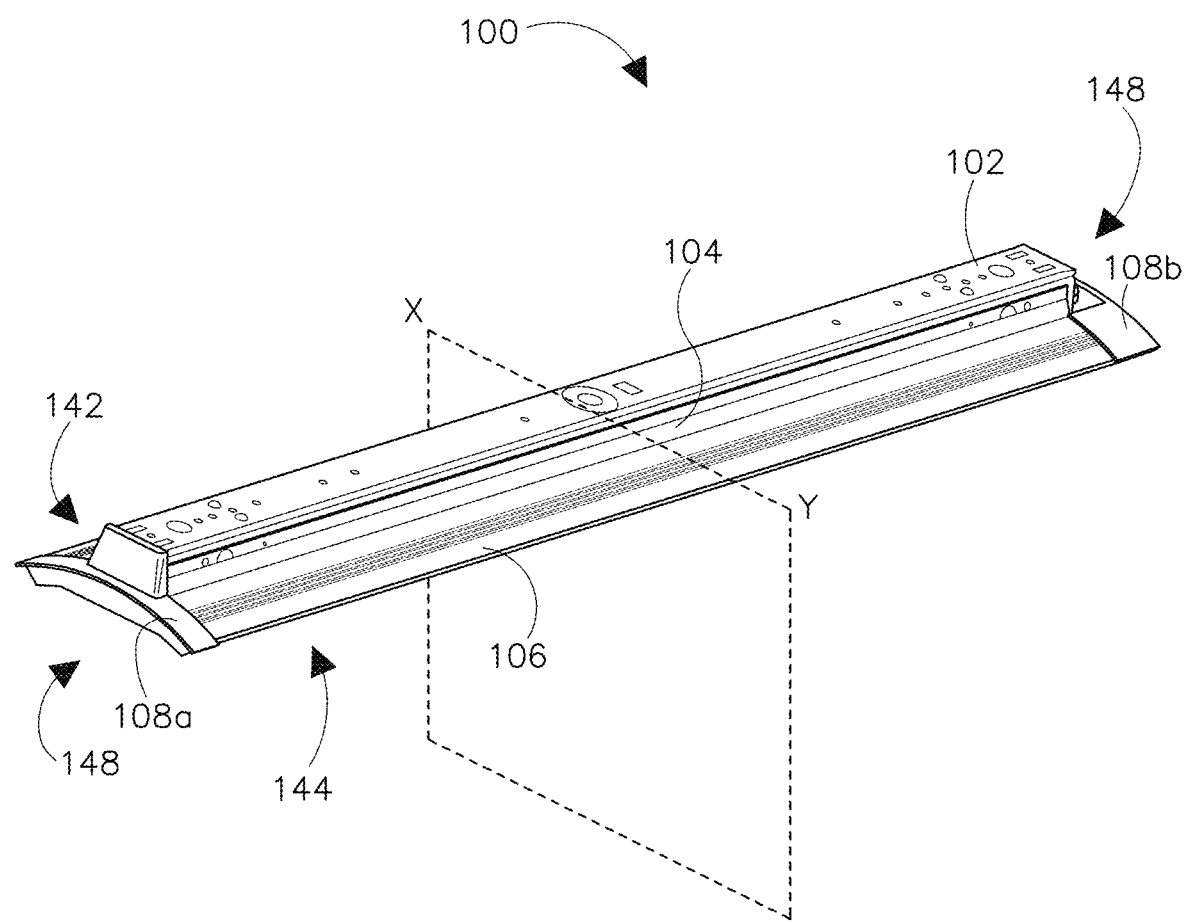
FIG. 1 illustrates a perspective view of a horizontal light guide based lighting fixture, in accordance with example embodiments of the present disclosure.

The figures illustrate only particular embodiments and are therefore not to be considered limiting in scope. The elements and features shown in the figures are not necessarily to scale, emphasis instead being placed upon clearly illustrating the principles of the particular embodiments. Additionally, certain dimensions or placements may be exaggerated to help visually convey such principles. In the figures, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

A lighting fixture of the present disclosure may include a light source and an element that receives, transmits, and emits light produced by the light source, such as a light guide. The light guide may have a generally planar format as may be provided with a slab, plate, sheet, or panel of optical material, for example. Further, the light guide may have one or more optical features embedded within the light guide to direct and control light emitted by the light source, i.e., the light emitting diodes (LEDs). In particular, the LEDs may be positioned proximate to an edge of the light guide such that the light guide receives the light emitted by the LEDs through the edge and exits the light through one or more major surfaces of the light guide in a beneficial direction as well as in an opposing direction. Even though the present disclosure describes the light source as comprising LEDs, one of ordinary skill in the art can understand and appreciate that in other embodiments, other appropriate types of light sources may be used without departing from a broader scope of the present disclosure.

Further, the lighting fixture includes side rails on each long side of the lighting fixture. In certain example embodiments, each side rail is configured to (i) house an LED circuit board, such as a printed circuit board on which the LEDs are disposed and (ii) securely engage and retain a long edge of the light guide such that the LEDs on the LED circuit board are positioned proximate to the respective long edge of the light guide. However, in other example embodiments, the LEDs may be positioned proximate to only one long edge of the light guide. That is, the light guide may be lit by LEDs positioned beside only one long edge of the light guide. In yet other example embodiments, the LEDs may be positioned beside each long edge and/or short edge (lateral edge) of the light guide depending on a desired light distribution and design of the light guide.

Furthermore, the lighting fixture may include one or more reflective elements. In particular, the reflector elements may be positioned at a distance above or adjoining a major surface of the light guide to redirect the light that is emitted by the light guide in the opposing direction, causing it to head in the beneficial direction. In some embodiments, the reflective elements may be removably coupled to the lighting fixture.

The lighting fixture may also include one or more built-in channels formed by a housing of the lighting fixture. The built-in channels may serve as a housing for electrical components, such as LED drivers, and/or wireways for routing wires that supply electrical power to the lighting fixture.

Additionally, the lighting fixture may include end plates that are coupled to the side rails and/or the built-in channel to securely retain the frame of the lighting fixture together and enclose the lateral ends of built-in channels and/or the side rails. The lighting fixture may also include end caps that are designed to (i) house a motion sensor and/or an emergency battery test switch and (ii) aesthetically cover the lateral ends of the lighting fixture. One of ordinary skill in the art can understand and appreciate that the end caps can house any other appropriate electronic component without departing from a broader scope of the present disclosure.

Further, the lighting fixture may include a quick attachment feature, such as a quick attachment end plate for quick and easy attachment and/or detachment of a housing of the lighting fixture and a light engine of the lighting fixture, i.e., an assembly of the light guide and light source, while the housing is installed as intended in a suspended or surface mounted application. Furthermore, the lighting fixture may be configured to be coupled with other lighting fixtures at each lateral end of the lighting fixture to extend the lighting fixture linearly in a variety of lengths (e.g., 2 feet, 4 feet, 8 feet, etc.). The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "exemplary embodiments" given herein are intended to be non-limiting and among others supported by representations of the present technology.

Figure 2:
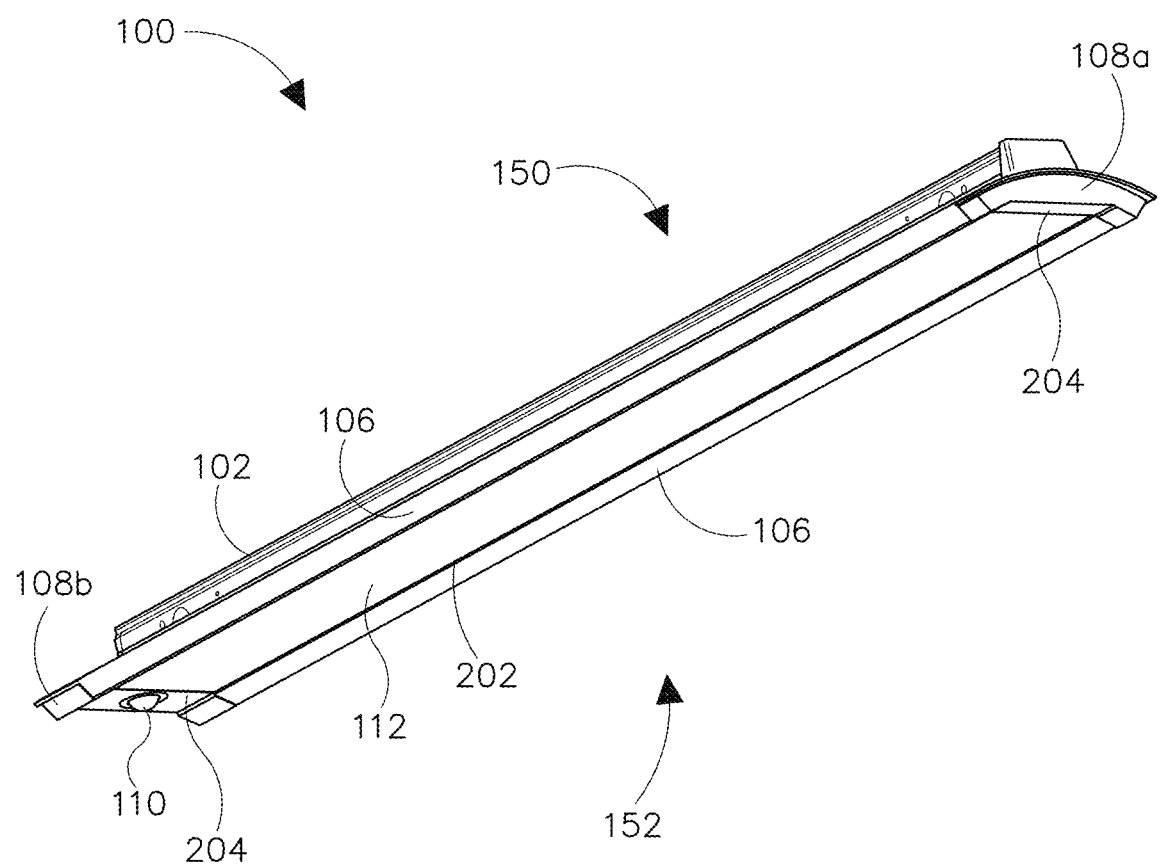
FIG. 2 illustrates another perspective view of the horizontal light guide based lighting fixture, in accordance with example embodiments of the present disclosure.
Figure 3:
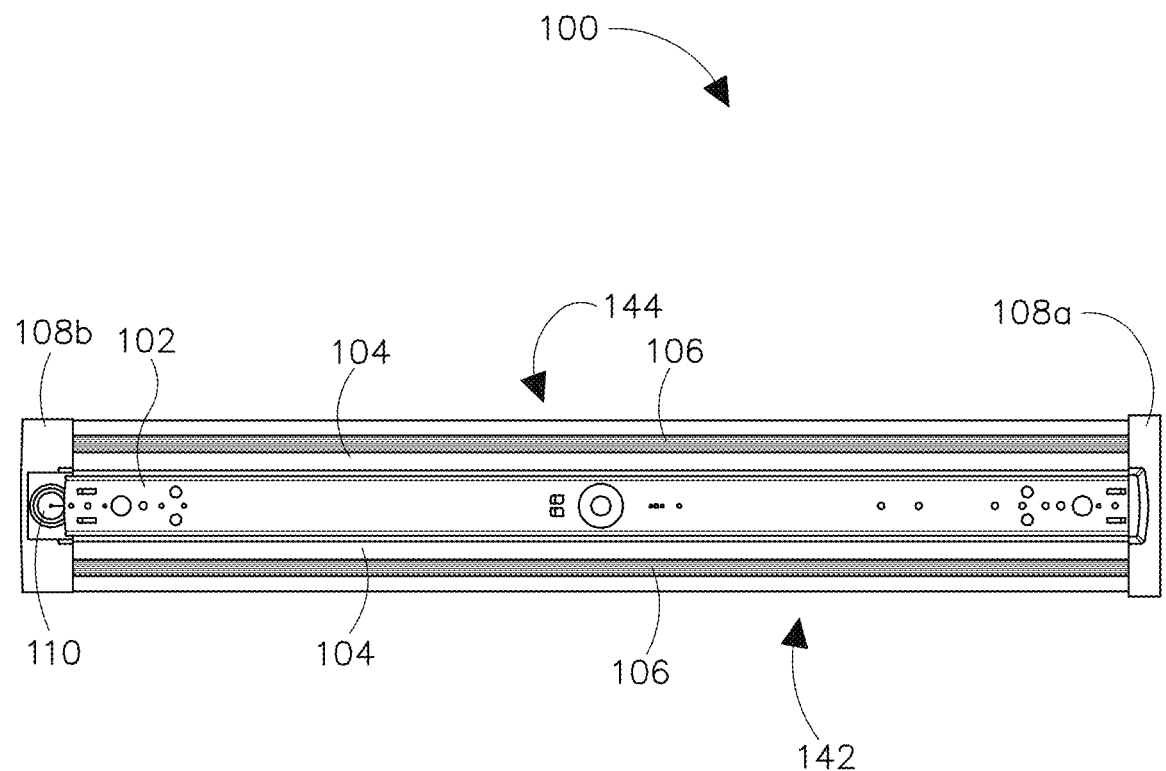
FIG. 3 illustrates a top view of the horizontal light guide based lighting fixture, in accordance with example embodiments of the present disclosure.
Figure 4:
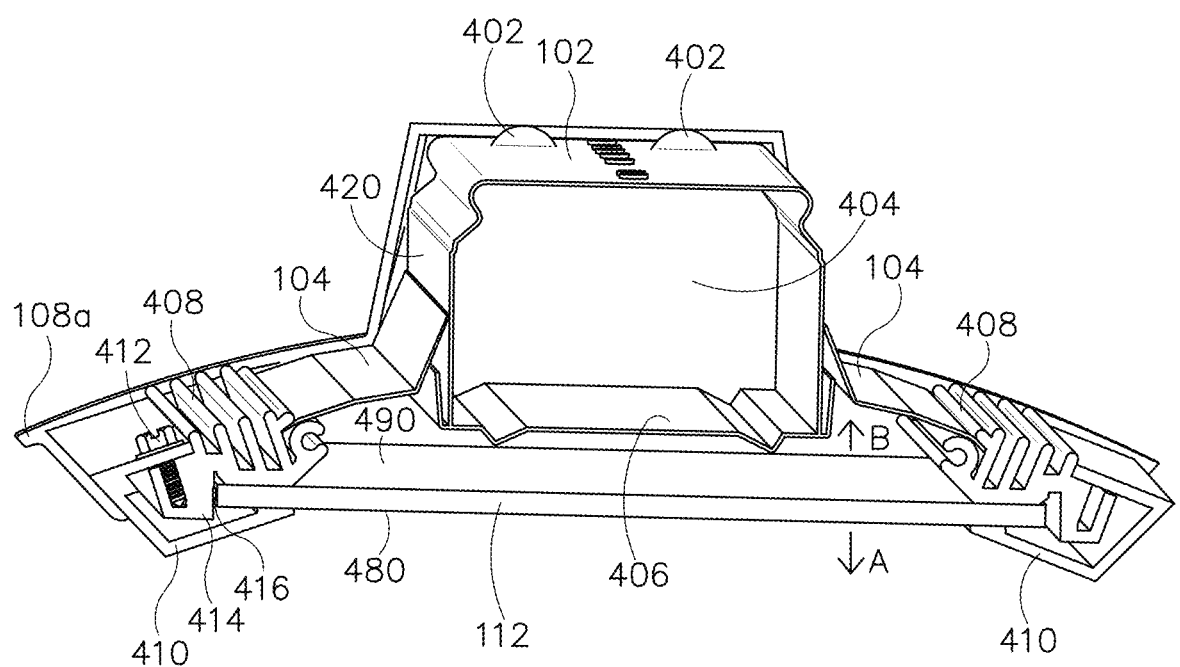
FIG. 4 illustrates a cross-sectional view of the horizontal light guide based lighting fixture along an X-Y plane illustrated in FIG. 1, in accordance with example embodiments of the present disclosure.
Figure 5:
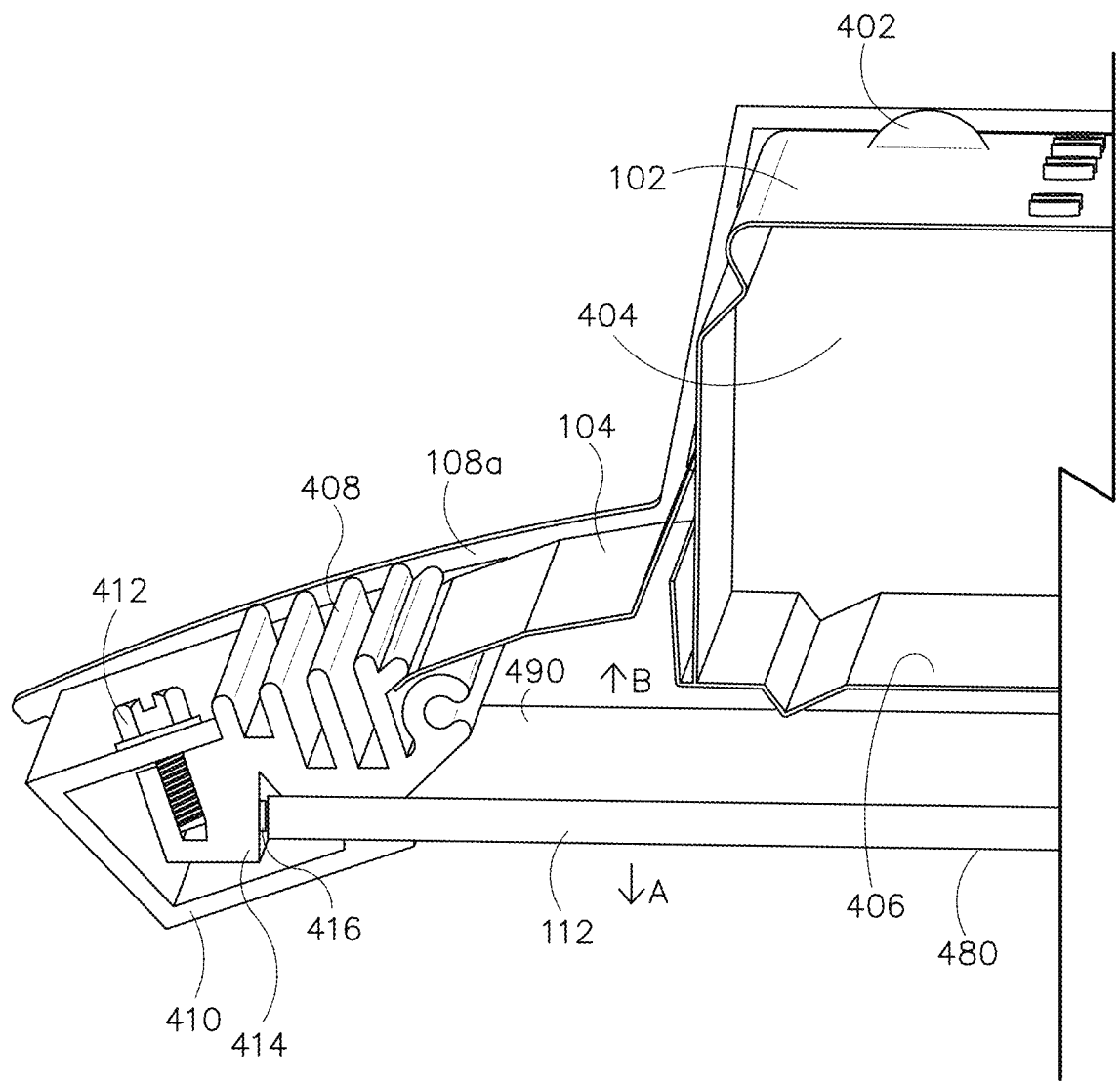
FIG. 5 illustrates an enlarged view of a portion of the cross-section of the horizontal light guide based lighting fixture along an X-Y plane illustrated in FIG. 1, in accordance with example embodiments of the present disclosure.

Turning now to the figures, particular embodiments are described. FIGS. 1 and 2 illustrate different perspective views of the horizontal light guide based lighting fixture (herein 'lighting fixture 100') in accordance with example embodiments of the present disclosure; FIG. 3 illustrates a top view of the lighting fixture 100, in accordance with example embodiments of the present disclosure; FIG. 4 illustrates a cross-sectional view of the lighting fixture 100 along an X-Y plane illustrated in FIG. 1, in accordance with example embodiments of the present disclosure; FIG. 5 illustrates an enlarged cross-sectional view of a portion of the lighting fixture 100 along an X-Y plane illustrated in FIG. 1, in accordance with example embodiments of the present disclosure; and FIG. 6 illustrates an exploded view of the lighting fixture 100 illustrated in FIG. 1, in accordance with example embodiments of the present disclosure.

Referring to FIGS. 1-6, the lighting fixture 100 is operable to illuminate an area around the lighting fixture 100. In particular, the lighting fixture 100 may include two side rails 106 positioned at opposing longitudinal ends 142, 144 of the lighting fixture 100 and two end caps positioned at opposing lateral ends 146, 148 of the lighting fixture 100. The two side rails 106 and the two end caps 108 (along with their respective end plates 702, 902 shown in FIGS. 7-10) may form a rectangular outer frame at a bottom side 152 of the lighting fixture 100.

Further, the lighting fixture 100 may include a light guide 112 that may be positioned at the bottom side 152 of the lighting fixture 100 and disposed within the rectangular outer frame of the lighting fixture 100. The light guide 112 may have two long edges 202 (herein 'longitudinal edges 202') and two short edges 204 (herein 'lateral edges 204'), each short edge extending from one end of the longitudinal edge to a corresponding end of the other longitudinal edge. In particular, each longitudinal edge 202 (or a portion thereof) of the light guide 112 may be securely retained by a respective side rail 106 of the lighting fixture 100 as illustrated in FIGS. 4 and 5.

Figure 6:
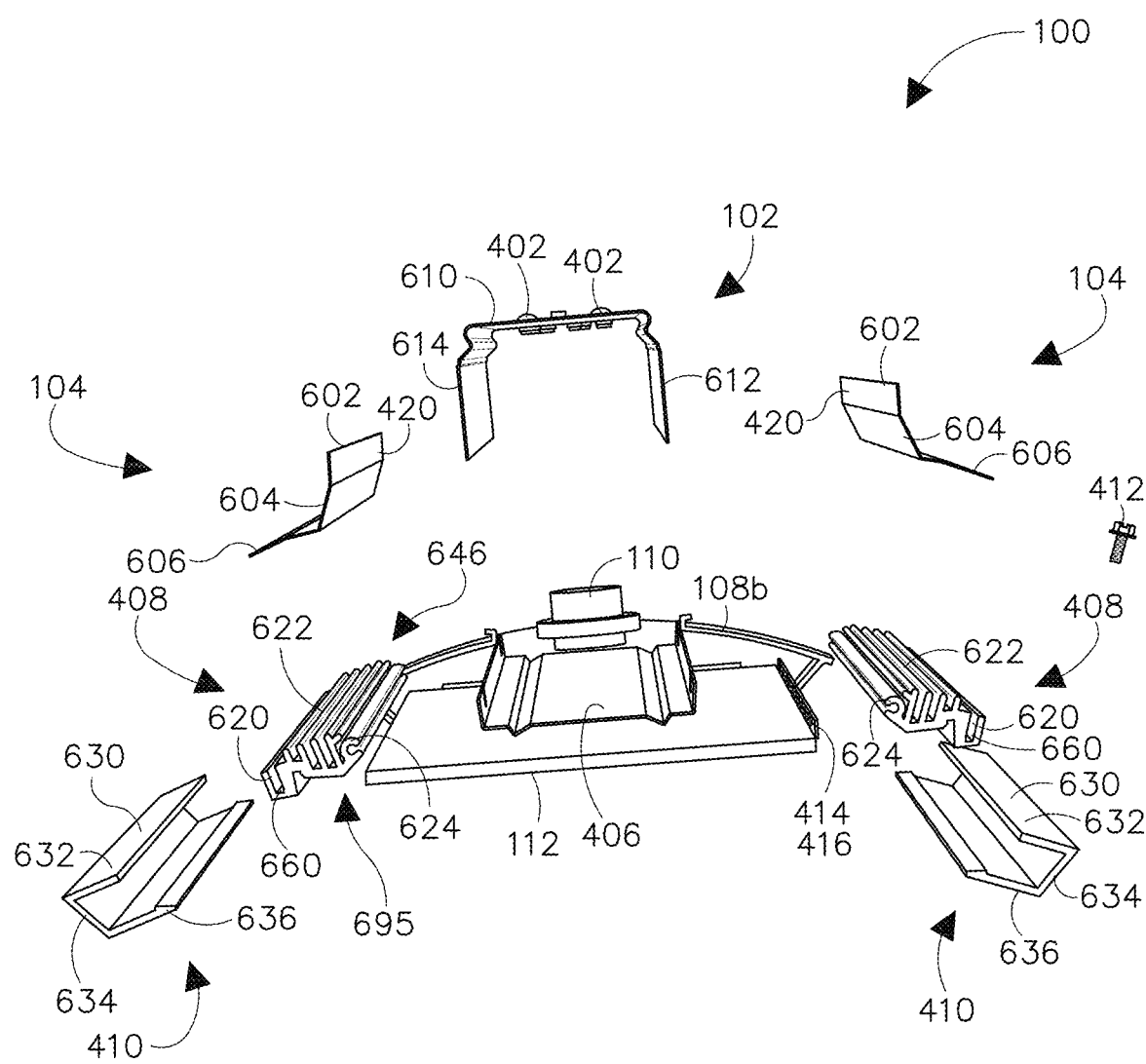
FIG. 6 illustrates an exploded view of the horizontal light guide based lighting fixture illustrated in FIG. 1, in accordance with example embodiments of the present disclosure.

Referring to FIGS. 4-6, each side rail 106 of the lighting fixture 100 may include a first side rail member 408 and a second side rail member 410 that are coupled together using one or more coupling members, e.g., fasteners, screws 412, along the length of the first and second side rail members 408, 410.

The first side rail member 408 may be an elongated member extending from a portion of one end cap 108a or end plate 702/902 (illustrated in FIGS. 7 and 9) disposed at one lateral end 146 of the lighting fixture 100 to a portion of the other end cap 108b or end plate 702/902 disposed at the opposing lateral end 148 of the lighting fixture 100. Alternatively, the first side rail member 408 may include a first lateral end 695, a second lateral end 696, and an elongated body that extends from the first lateral end 695 to the second lateral end 696. In certain example embodiments, the longitudinal length of the first side rail member 408 that extends from the first lateral end 695 to the second lateral end 696 may depend upon the length of the longitudinal edge of the light guide 112.

In particular, the first side rail member 408 includes a C-shaped portion 624, a bracket portion 620, and a fin portion 622 having one or more fins and positioned between the C-shaped portion 624 and the bracket portion 620. Even though the first side rail member 408 is described as having three different portions, one of ordinary skill in the art can understand and appreciate the first side rail member 408 is a single piece component where the C-shaped portion 624, the fin portion 622 having one or more fins, and the bracket portion 620 are integral to the first side rail member 408 and form the elongated body of the first side rail member 408.

Further, the second side rail member 410 may be a substantially C shaped elongated member, where a long side of the second side rail member 410 extends approximately the same length as that of the first side rail member. In particular, the second side rail member 410 may include a first planar portion 630 (herein 'first portion'), a second planar portion 634 (herein 'second portion') extending from an end of the first portion 630 at an angle to the first portion 630, and a third planar portion 636 (herein 'third portion') extending from an end of the second portion 634 at an angle to the second portion 634. In certain example embodiments, the third portion 636 extends in a direction that is substantially parallel to the first portion 630. Further, the first portion 630 of the second side rail member 410 may include one or more apertures 632 along a longitudinal length of the first portion 630.

As illustrated in the example embodiments of FIGS. 4 and 5, the first side rail member 408 and the second side rail member 410 may be aligned such that (i) the first portion 630 of the second side rail member 410 is disposed on top of the bracket portion 620 of the first side rail member such that the one or more apertures 632 of the first portion 630 of the second side rail member 410 aligns with an elongated cavity 660 in the bracket portion 620 of the first side rail member 408, and (ii) an elongated space extending from the first lateral end 695 and the second lateral end 696 of the first side rail member 408 is formed between the first side rail member 408 and the third portion 636 of the second side rail member 410 to securely retain a longitudinal edge 202 of the light guide 112.

Once the one or more apertures 632 of the first portion 630 of the second side rail member 410 are aligned with an elongated cavity 660 in the bracket portion 620 of the first side rail member 408, a coupling member, e.g., screw 412 may be inserted through each aligned aperture 632 and elongated cavity 660 to couple the first side rail member 408 to the second side rail member 410. In particular, the fastener 412 may be inserted substantially perpendicular to the elongated cavity 660 defined by the bracket portion 620 of the first side rail member 408. Even though the side rail 106 is described above as a two-part component, one of ordinary skill in the art can understand and appreciate that the side rail 106 can be formed as a single piece component without departing from a broader scope of the present disclosure as described below in association with FIGS. 15-27. Further, one of ordinary skill in the art can understand and appreciate that the first side rail member and the second side rail member can have any other appropriate shape and size without departing from a broader scope of the present disclosure.

Referring to FIGS. 1-6, the lighting fixture 100 may have end caps 108a/108b that are disposed at opposing lateral ends of the lighting fixture 100. In particular, the end caps 108a/108b may be configured to slide fit or interference fit with the side rails 106 and/or the electrical component housing bracket 102 such that the end caps 108a/108b cover at least a portion of the lateral ends of the side rails 106 and/or the electrical component housing bracket 102. However, one of ordinary skill in the art can understand and appreciate that any other appropriate coupling mechanism may be used to couple the end caps to the side rail 106 and/or the electrical component housing bracket 102. In some example embodiments, the end cap 108a/108b may have a cross-sectional shape that is substantially similar to a cross sectional shape of the lighting fixture 100 along the X-Y plane illustrated in FIG. 1. That is, the end caps 108a/108b may be shaped to fit over and around a portion of the side rails 106 and/or the electrical component housing bracket 102. However, one of ordinary skill in the art can understand and appreciate that in other example embodiments, the end cap can have any other appropriate cross-sectional shape that partially or fully covers a lateral end of the side rails 106 and/or the electrical component housing bracket 102.

Figure 13:
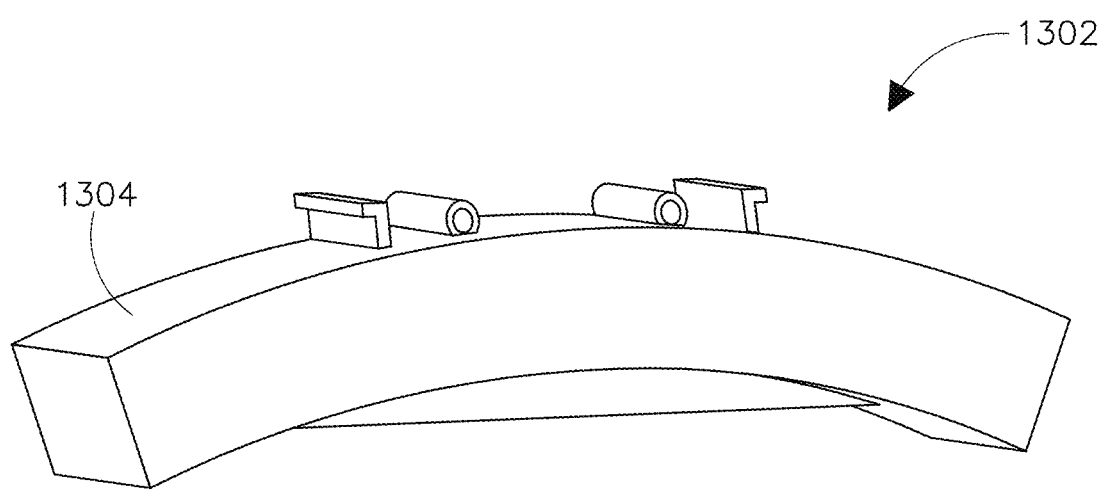
Figure 14:
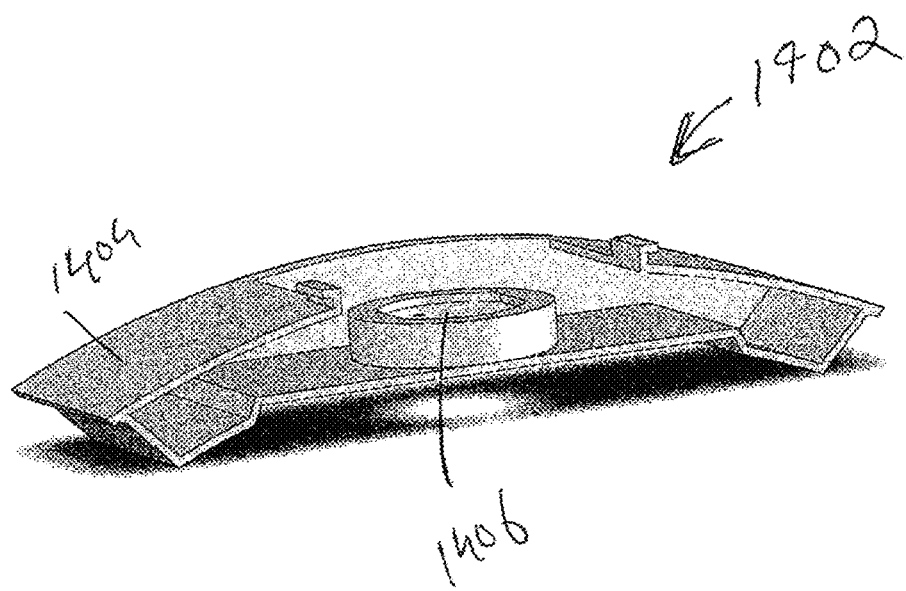

In one example embodiment, the end cap 108a and 108b may be formed as a single-piece component. Alternatively, the end cap 108a/108b may be a multi-part component, where the multiple parts are coupled together to form the end cap. For example, the end cap 108a/108b may be a two-part component having a top member 1102 illustrated in FIG. 11 and a bottom member 1302 or 1402 as illustrated in FIGS. 13 and 14, respectively, that may be coupled together using a snap fit mechanism to form the end cap 108a/108b. Even though the above-mentioned example describes a snap fit coupling mechanism, one of ordinary skill in the art can understand and appreciate that any other appropriate coupling mechanism may be used to couple together the various parts of the end cap.

In some embodiments, the end cap 108b may be configured to house any appropriate electrical component 110, such as a motion sensor or an emergency test switch within the end cap 108b as illustrated in FIG. 3. An example end cap 1402 that is configured to house an electrical component 110 is illustrated in FIG. 14. As illustrated in FIG. 14, an opening 1406 formed in the end cap 1402 allows the lens or sensor portion of the motion sensor 110 to face out from the backside of the end cap 1402 (facing an area to be illuminated (direction A)) while being coupled to the motion sensor body 110 disposed within the end cap 1402.

Figure 11:
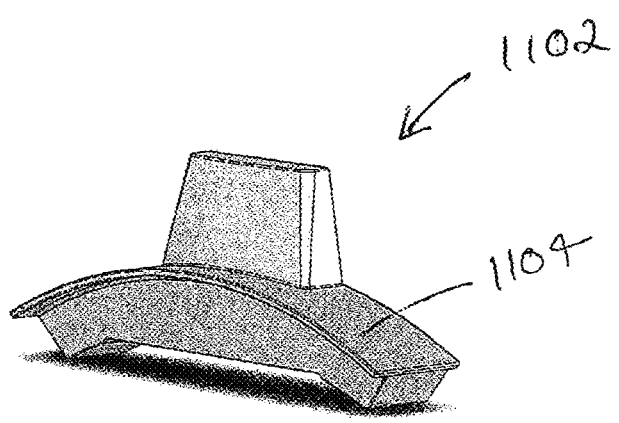
FIGS. 11-14 illustrate different perspective views of different types of end caps, in accordance with example embodiments of the present disclosure.
Figure 12:
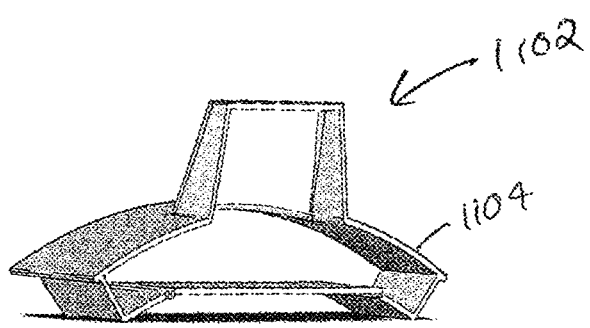

Furthermore, as illustrated in FIGS. 11-14, the end caps include a curve design 1104, 1304, and 1404, respectively, to provide the lighting fixture 100 an appearance of a curved fixture even though the light guide 112 is oriented horizontally. One of ordinary skill can also understand and appreciate that the end cap members 1102, 1302, and 1402 illustrated in FIGS. 11-13 are examples and are not limiting. That is, other appropriate type of end caps having different shapes and sizes are within a broader scope of the present disclosure.

Referring to FIGS. 1-6, the lighting fixture 100 further includes an electrical component housing bracket 102 (herein 'housing bracket 102') disposed on a top side 150 of the lighting fixture 100 that is opposite to the bottom portion 152 of the lighting fixture 100 where the light guide 112 is disposed. The housing bracket 102 may be a substantially C-shaped elongated member extending from a portion of one end cap 108a disposed at one lateral end 146 of the lighting fixture 100 to a portion of the other end cap 108b disposed at the opposing lateral end 148 of the lighting fixture 100. Even though the housing bracket 102 is described above as a C shaped elongated member, one of ordinary skill in the art can understand and appreciate that the housing bracket 102 can have any appropriate shape without departing from a broader scope of the present disclosure.

In particular, the housing bracket 102 includes two side panels 612 and 614 that are substantially parallel to each other and extend in the same direction. Further, the housing bracket 102 includes a middle panel 610 disposed between corresponding top ends of the two side panels 612 and 614 and is substantially perpendicular to the two side panels 612 and 614. The middle panel 610 of the housing bracket 102 forms a mounting surface. In particular, the middle panel 610 may include a plurality of dome shaped leveling features 402 to provide an appropriate spacing between the mounting surface and the lighting fixture 100 for a level mounting. Further, the middle portion 610 of the housing bracket 102 may include one or more mounting features, such as apertures for screws, clamps, etc., for mounting the lighting fixture 100 to a mounting surface.

In an example embodiment, the lighting fixture 100 can be surface mounted or suspended from a ceiling. Further, the lighting fixture 100 of the present disclosure can be row mounted with multiple fixtures end to end. Furthermore, in another example embodiment, the lighting fixture 100 may also be wall mounted. For example, the lighting fixture 100 may be mounted such that the middle panel 610 of the housing bracket 102 may be flush with the wall and the light guide 112 faces away from the wall towards an area to be illuminated. Alternatively, the lighting fixture 100 may be wall mounted using a cantilever beam. For example, a cantilever beam may be installed on the wall and the lighting fixture 100 may be suspended from an end of the cantilever beam. Additionally, in some embodiments, the lighting fixture 100 may be mounted within a recess in the ceiling or the wall such that a majority portion of the lighting fixture may be hidden in the recess and only a portion of the lighting fixture, such as the light guide and a portion of the side rail may be visible outside. In another example recess mounting, the lighting fixture 100 may be mounted such that the light guide and a portion of the side rail may be flush with the wall or ceiling after installation.

As illustrated in FIGS. 4-6, the housing bracket 102 may include a base bracket member 406 that is coupled to a bottom portion of the side panels 612 and 614 to form a hollow compartment 404 at a distance above the light guide 112. The compartment 404 may have a rectangular cross-sectional shape as illustrated in FIGS. 4 and 5 and can house various electronic components, wires, and the like, hiding such components from view. In other example embodiments, the compartment 404 can have various other cross-sectional shapes, such as a round or curved shape, and other geometric and non-geometric shapes without departing from a broader scope of the present disclosure.

Referring to FIGS. 1-6, the lighting fixture 100 also includes a pair of reflectors 104 disposed on opposite sides of the housing bracket 102 and at a distance above the light guide 112. In particular, the reflector 104 has a first portion 602, a second portion 604 extending from an end of the first portion 602 at an angle to the first portion, and a third portion 606 extending from an end of the second portion 604 at an angle to both the first and the second portions 602, 604. Each of the second and third portions 604, 606 of the reflector 104 extends away from the housing bracket 102 forming a curved shape. Further, the first, second, and third portions 602, 604, and 606 of the reflector may be substantially planar. Even though the reflector is described above as having three portions, one of ordinary skill in the art can understand that the reflector can have any other appropriate shape without departing from a broader scope of this disclosure. For example, instead of a pair of reflectors disposed on either side of the housing bracket 102, the lighting fixture 100 may have a single reflector that extends from one side of the lighting fixture (i.e., one side rail) to the other side (i.e., the opposite side rail) without departing from a broader scope of this disclosure. In yet another example, the reflector 104 may be a planar element that is disposed adjoining a major surface 490 of the light guide 112 such that light exiting the light guide 112 in the direction B may be directed back towards the beneficial direction A.

Referring to FIGS. 4-6, the first portion 602 of the reflector 104 may include one or more apertures 420. The reflector 104 may be coupled to the lighting fixture 100 by disposing the first portion 602 of the reflector on one of the two side panels 612, 614 of the housing bracket 102 such that the apertures 420 in the first portion 602 of the reflector 104 are aligned with corresponding apertures on one of the two side panels 612, 614. Further, a coupling member, such as a screw may be inserted through the aligned apertures of the first portion 602 of the reflector 104 and the respective side panel 612/614 of the housing bracket 102. Further, at least a portion of the third portion 606 of the reflector 104 that is farthest away from the first and second portion of the reflector 104 may be securely retained in a cavity/notch formed between the elongated C-shaped portion 624 and one of the fins of the fin portion 622 of the first side rail member 408. Similarly, the second reflector may be coupled to the opposite side of the housing bracket 102.

The reflectors 104 may be detachably coupled to the lighting fixture 100 as described above. Detaching the reflectors 104 from the lighting fixture 100 may provide one or more open slots on the top portion of the lighting fixture 100 between the housing bracket 102 and the side rail 106 through which light can escape, thereby providing uplighting. Alternatively, openings, such as slots, slits, apertures, etc., can be formed in the reflector to control the amount of uplight without detaching the reflector 104 from the lighting fixture 100 based on a desired application of the light fixture 100. The term 'uplight' as used herein refers to light emitted from the light guide 112 in the direction that is opposite to or other than the area to be illuminated, e.g., direction B.

Figure 7:
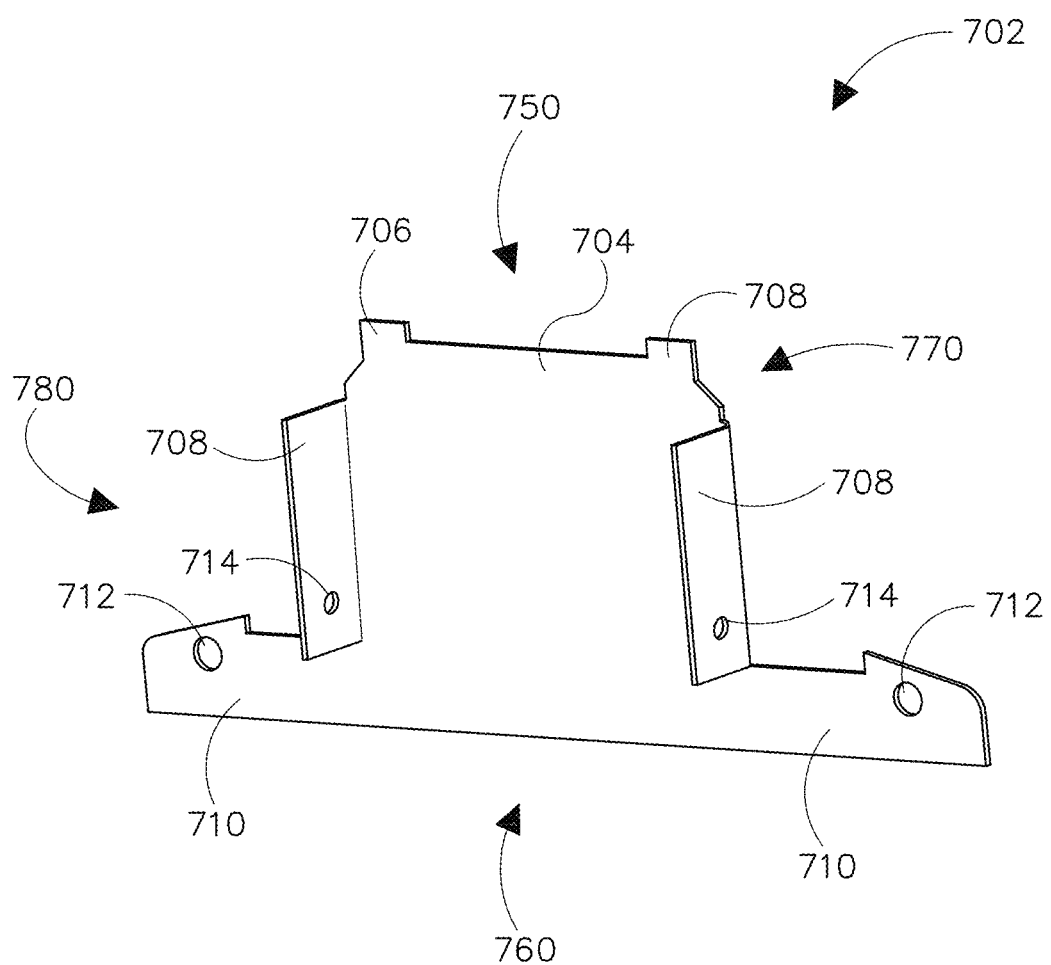
FIG. 7 illustrates a perspective view of an end plate of the horizontal light guide based lighting fixture, in accordance with example embodiments of the present disclosure.
Figure 8:
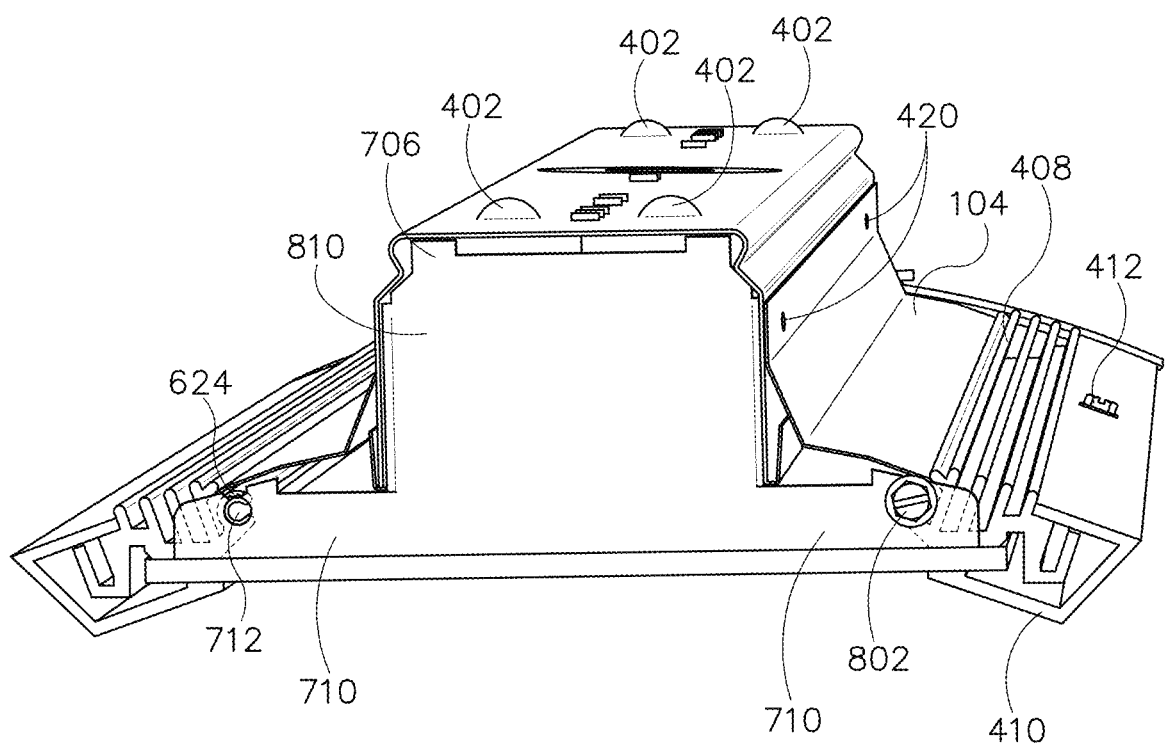
FIG. 8 illustrates a perspective view of the horizontal light guide based lighting fixture with an end cap being removed to illustrate a coupling of the end plate of FIG. 7 with the horizontal light guide based lighting fixture, in accordance with example embodiments of the present disclosure.
Figure 9:
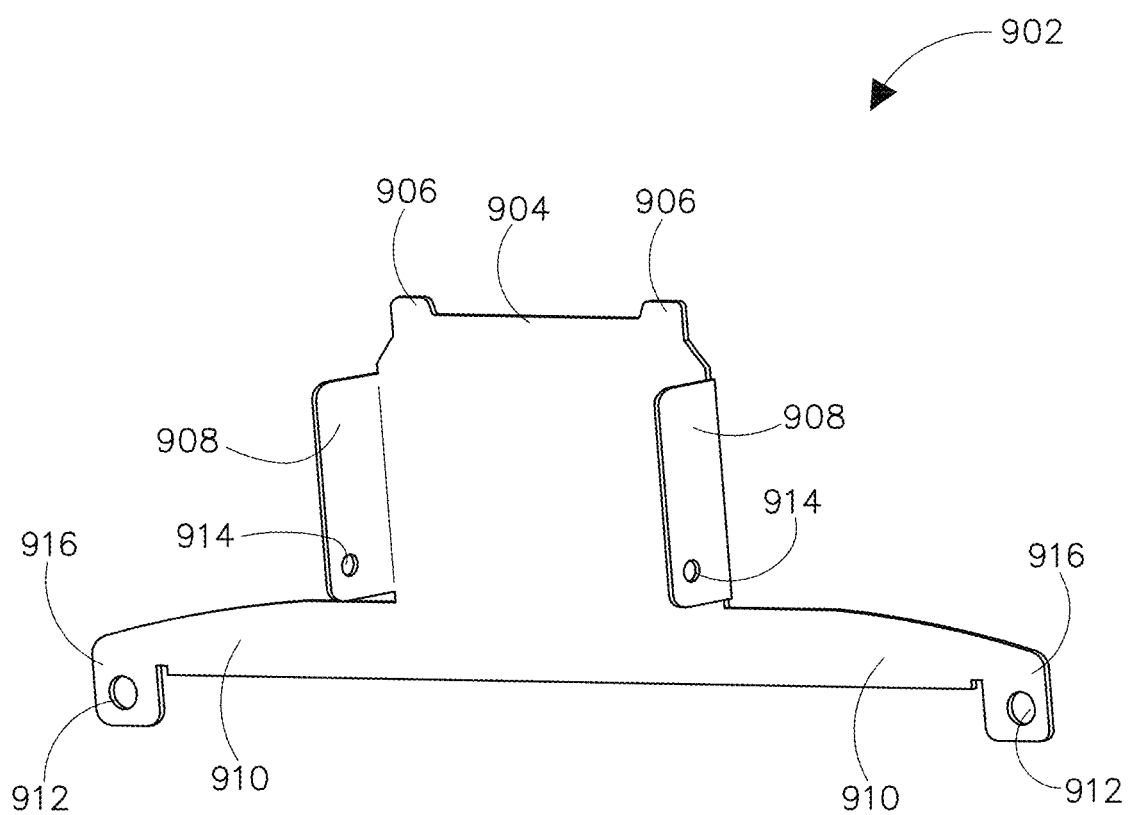
FIG. 9 illustrates a perspective view of another end plate of the horizontal light guide based lighting fixture, in accordance with example embodiments of the present disclosure.

Turning to FIGS. 7-10, these figures illustrate different example end plates and how the end plates are coupled to the lighting fixture. In particular, FIGS. 7 and 9 illustrate end plates 702 and 902, respectively. The end plates 702 and/or 902 may be disposed between the end caps 108 and the housing bracket 102 and/or the side rails 106 to partially or fully enclose the lateral ends of the housing bracket 102 and/or the side rails 106. For example, once the end plates 702 and/or 902 is coupled to the housing bracket 102, the end plates 702 and/or 902 provide an enclosed compartment 404 for housing electronic components and/or wiring hidden from plain view.

Referring to FIG. 7, the end plate 702 has an interior surface 704 and an exterior surface 810 (shown in FIG. 8) that is opposite to the interior surface 704. In particular, the end plate 702 has a pair of projections 706 that extend from either end of a top edge 750 of the end plate 702 in the same plane as the end plate 702. Further, the end plate 702 includes a flange member 708 that extends in a plane substantially perpendicular to the end plate from at least a portion of each side edge 770, 780 of the end plate 702. The flange 708 extends in a direction opposite to the direction of the exterior surface 810. Furthermore, the end plate 702 includes two leg members 710 at a bottom portion 760 of the end plate 702 that extend beyond the length of the top edge 750. In particular, the leg members 710 are positioned below the flanges 708 and extend from both side ends 770, 780 of the end plate 702 in the same plane as the end plate 702. The leg portions 710 may be substantially perpendicular to the flange members 708 and they extend in opposite directions from both sides 770, 780 of the end plate 702, i.e., one leg member 710 extends in the direction of the first side end 770 and the other leg member 710 extends in the direction of the second side end 780. Each of the flanges 708 and the leg members 710 may include one or more apertures 714 and 712, respectively, that aid in coupling the end plate 702 to the lighting fixture 100.

Turning to FIG. 8, this figure illustrates a perspective view of the lighting fixture 100 with an end cap of the horizontal light guide based lighting fixture being removed to illustrate a coupling of the end plate 702 of FIG. 7 with the lighting fixture 100 in accordance with example embodiments of the present disclosure. In particular, the end plate 702 may be coupled to the lighting fixture 100 by coupling the flanges 708 of the end plate 702 to the side panels 612, 614 of the housing bracket 102, and by coupling the leg members 710 of the end plate 702 to the side rails 106. In an example embodiment, the end plate 702 may be positioned such that interior surface 704 of the end plate 702 faces the compartment 404 of the housing bracket 102 and the projections 706 of the end plate 702 may rest below the middle panel 610 of the housing bracket 102. The flanges 708 of the end plate 702 may be in contact with an interior portion of the side panels 612, 614 of the housing bracket 102 such that the apertures 714 in the each end plate flange 708 may be aligned with corresponding apertures in the respective side panel 612, 614 of the housing bracket 102. Furthermore, each leg member 710 of the end plate 702 may be aligned with the respective side panel 106 of the lighting fixture 100 such that the aperture 712 in each leg member 710 of the end plate 702 may be axially aligned with a cavity defined by the elongated C-shaped portion 624 of the respective first side rail member 408. Once the apertures of the flanges 708 are aligned with the apertures of the housing bracket 102 and the apertures 712 of the leg members 710 are axially aligned with the cavity defined by the C-shaped portion 624 of the first side rail member 408, a coupling member, such as a screw may be inserted through the aligned apertures to couple the end plate 702 to the lighting fixture 100. For example, screw 802 may be inserted through the axially aligned aperture 712 of the end plate 702 and the cavity defined by the C-shaped portion 624 of the first side rail member 408 to couple the end plate 702 to the side rail 106.

Figure 10:
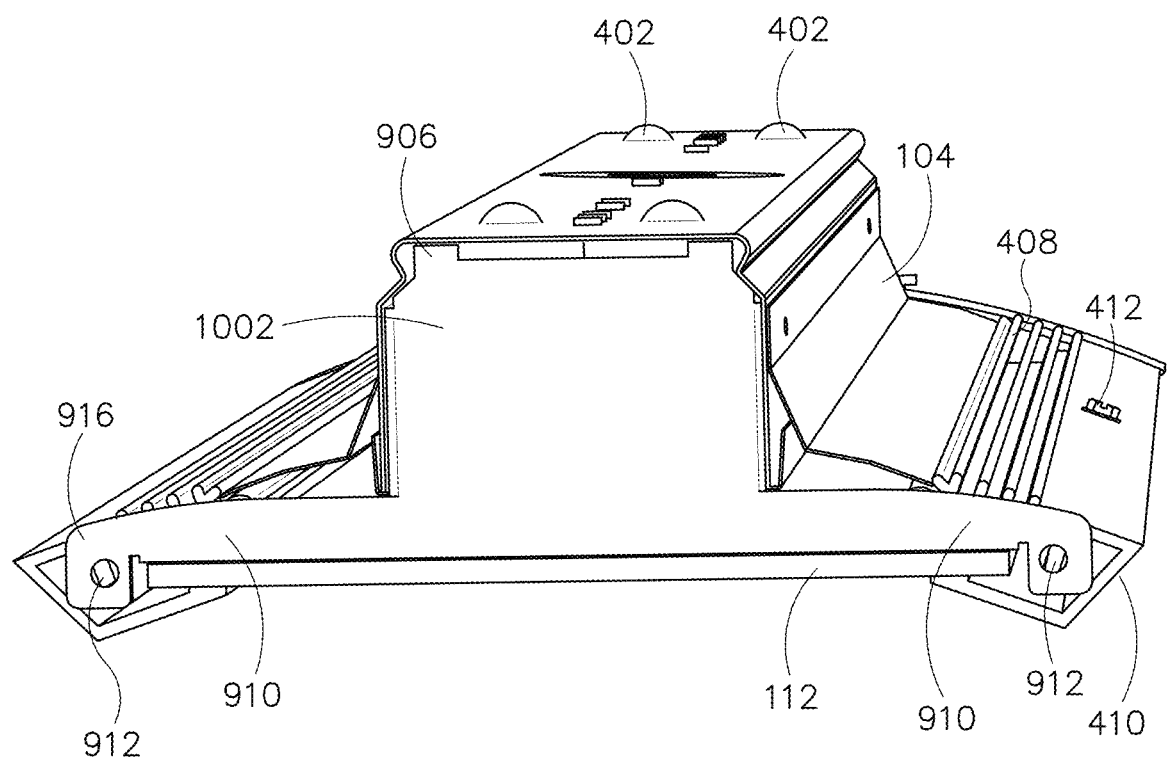
FIG. 10 illustrates a perspective view of the horizontal light guide based lighting fixture with an end cap being removed to illustrate a coupling of the end plate of FIG. 9 with the horizontal light guide based lighting fixture, in accordance with example embodiments of the present disclosure.

Turning to FIGS. 9 and 10, these figures illustrate another example end plate and how the end plate is coupled to the lighting fixture 100. The end plate 902 of FIG. 9 is substantially similar to the end plate 702 of FIG. 7, except that the leg members 910 of the end plate 902 include projections 916 that extend from opposite ends of each leg member 910. Further, the end plate 902 may include an aperture 912 that is positioned on each projection 916. Further, the coupling of the end plate 902 of FIG. 9 with the side rails may be different from that of the end plate 702 of the FIG. 7 in that the aperture 912 on each projection 916 of the end plate 902 may be axially aligned with a cavity 660 in the bracket portion 620 of each first side rail 408 rather than a cavity defined by the C-shaped portion 624 of the first side rail 408. In either design, the end plates 702 and/or 902 may be coupled to the housing bracket 102 and/or the side rails 106.

One of ordinary skill in the art can understand and appreciate that the end plates shown in FIGS. 7 and 9 are examples and are not limiting. That is, end plates that have any other appropriate shape, size, and design are within the broader scope of the present disclosure. Further, any other appropriate coupling mechanism in addition to or other than fasteners for coupling the end plates to the lighting fixture are within a broader scope of the present disclosure.

Referring back to FIGS. 4 and 5, in certain example embodiments, the lighting fixture 100 includes a respective line of LEDs 416 disposed on a circuit board 414. The circuit board 414 is positioned on and extends along the length of the elongated bracket portion 620 of the first side rail member 408. In particular, the circuit board 414 is positioned on or within the side rail 106 such that the LEDs 416 disposed on the circuit board 414 are directed towards a longitudinal edge 202 of the light guide 112. In particular, FIGS. 4 and 5 illustrate the LEDs being positioned only along one of the side rail members 408 of the lighting fixture 100, however, one of ordinary skill in the art can understand and appreciate that the lighting fixture 100 can have LEDs positioned on or within both the side rail members 408 of the lighting fixture 100 without departing from a broader scope of the present disclosure. In some embodiments, the side rails 106 may act as a heat sink for the LED circuit board 414 by virtue of the circuit board 414 being positioned on or within the side rails 106.

The LEDs 416 emit light into the light guide 112, and the light propagates in the light guide 112 guided by one or more optical features of the light guide 112 and/or by total internal reflection between two major surfaces 480, 490 of the light guide 112. While light that is emitted into the light guide 112 at relatively shallow angles undergoes total internal reflection, light at steeper angles spills/exits through the major surfaces 480, 490.

The major surface 480 of the light guide 112 is oriented in a direction A by the side rails 106 for illuminating an area to be illuminated, while the major surface 490 is oriented facing away from the area to be illuminated, e.g., in a direction B. Thus, when the lighting fixture 100 is installed, light emitting through the major surface 490 provides illumination in a direction B away from the area to be illuminated, while light emitting through the major surfaces 480 is directed towards direction A, i.e., the area to be illuminated. In some embodiments, the reflectors 104 are disposed above and facing the major surface 490 to redirect the light emitted from major surface 490 back towards the light guide 102 for transmission towards the area to be illuminated, i.e., in direction A. However, in other embodiments, the reflector 104 may be detached from the lighting fixture 100, thereby providing an uplight based on the light emitted from the major surface 490 in the direction B. Alternatively, the reflector 104 may be provided with openings to control an amount of uplight as desired by an application of the lighting fixture 100 without detaching the reflector 104. In certain embodiments, each reflector 104 comprises a mirror or any appropriate reflective surface. In other embodiments, each reflector 104 comprises a diffusely reflective surface such as a surface coated with flat white paint. In yet other embodiments, each reflector 104 is faceted or comprises a surface relief pattern or other features that promote directionality of light.

The light guide 112 may be biased such that a majority of light is emitted through the major surface 480 facing and area to be illuminated. For example, the light guide 112 may be configured to emit approximately 60% of the light through the major surface 480 facing the area to be illuminated and 40% of the light through the major surface 490 facing a direction B. One of ordinary skill in the art can understand and appreciate that the lighting fixture 100 can have a light guide 112 that is not biased without departing from a broader scope of the present disclosure.

Lighting Fixture with Quick Attachment Feature

Figure 15:
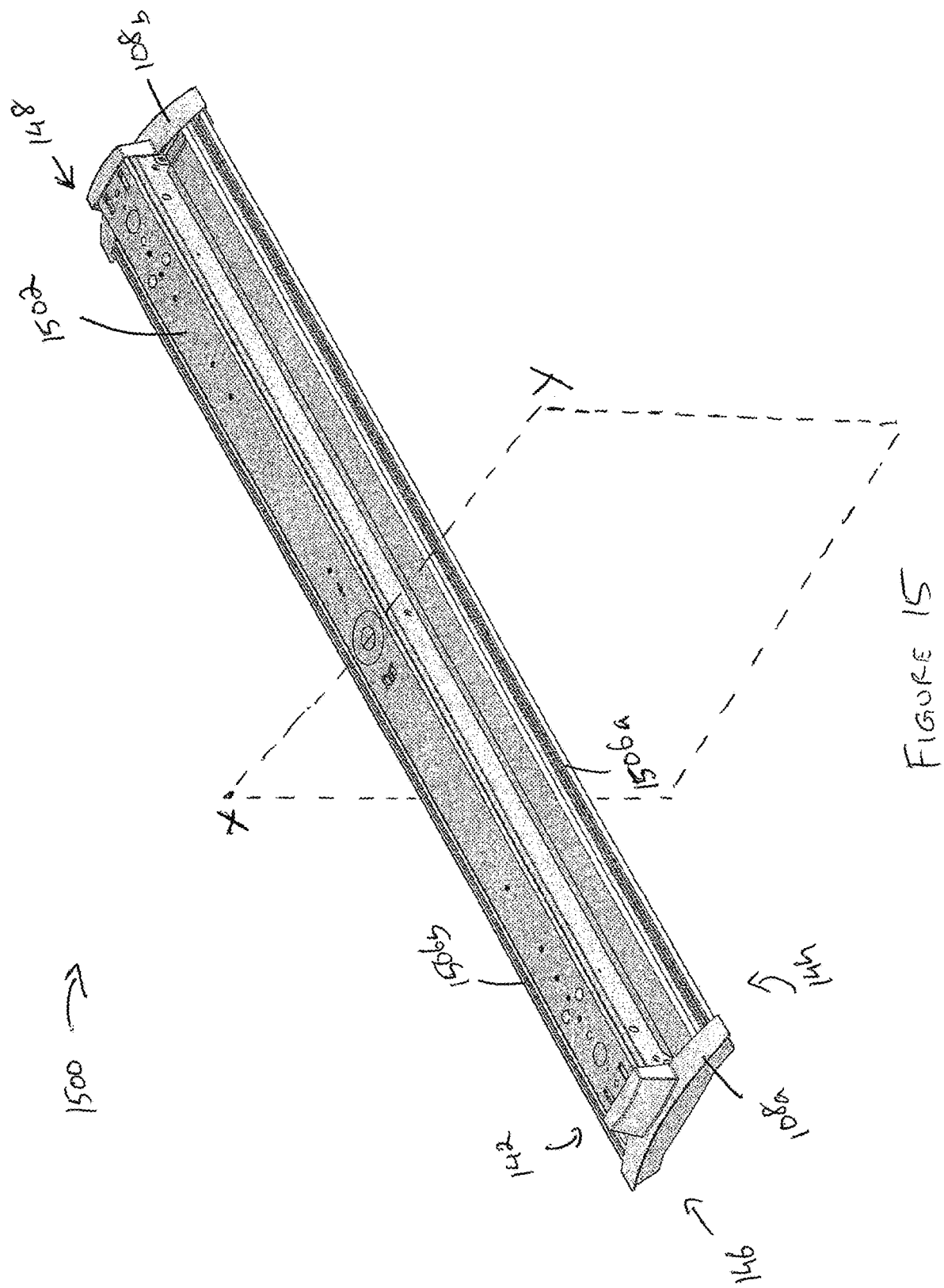
FIG. 15 illustrates a perspective view of another horizontal light guide based lighting fixture having a quick attachment end plate, in accordance with example embodiments of the present disclosure.
Figure 16:
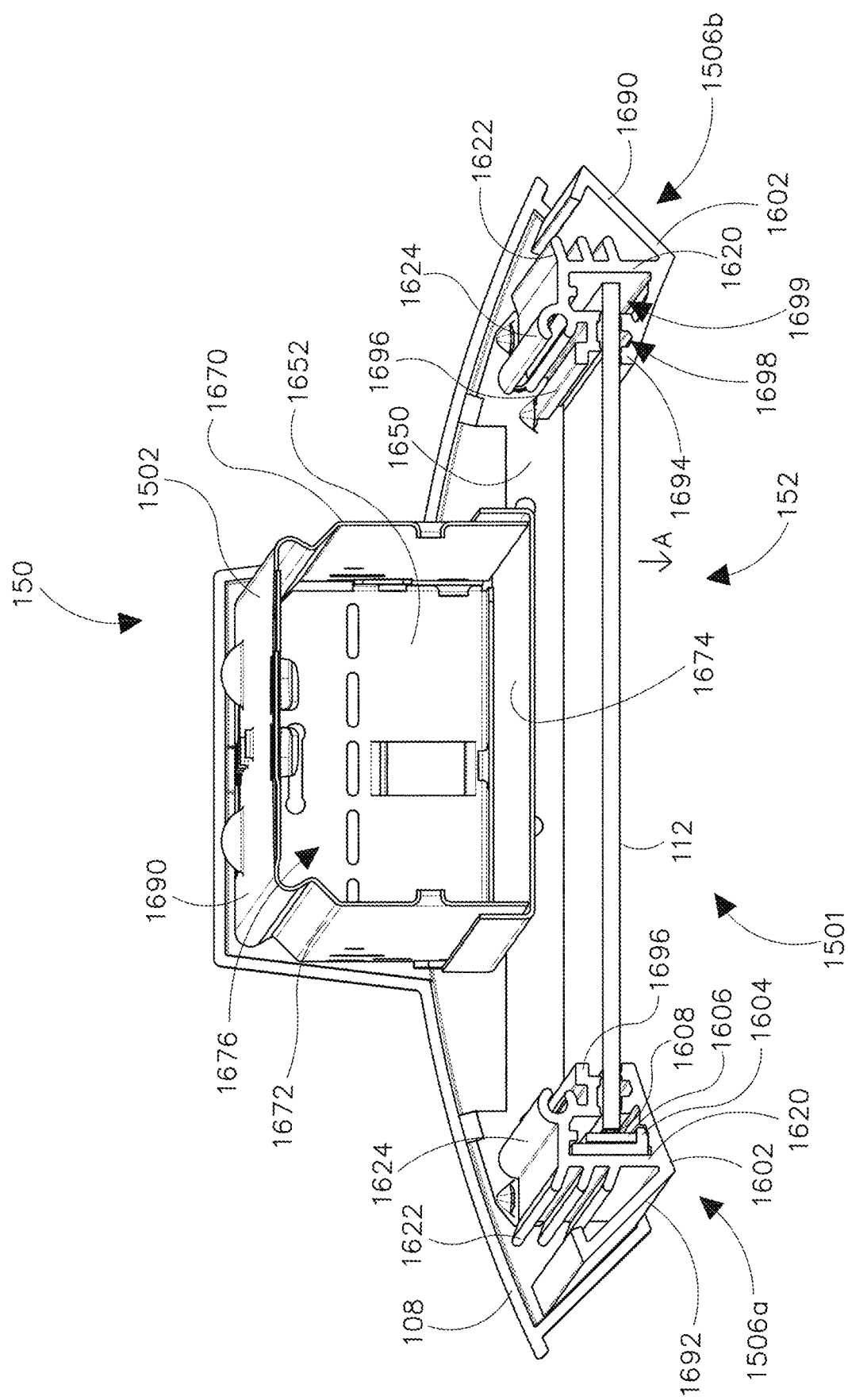
FIG. 16 illustrates a cross-sectional view of the horizontal light guide based lighting fixture along an X-Y plane illustrated in FIG. 15, in accordance with example embodiments of the present disclosure.
Figure 17:
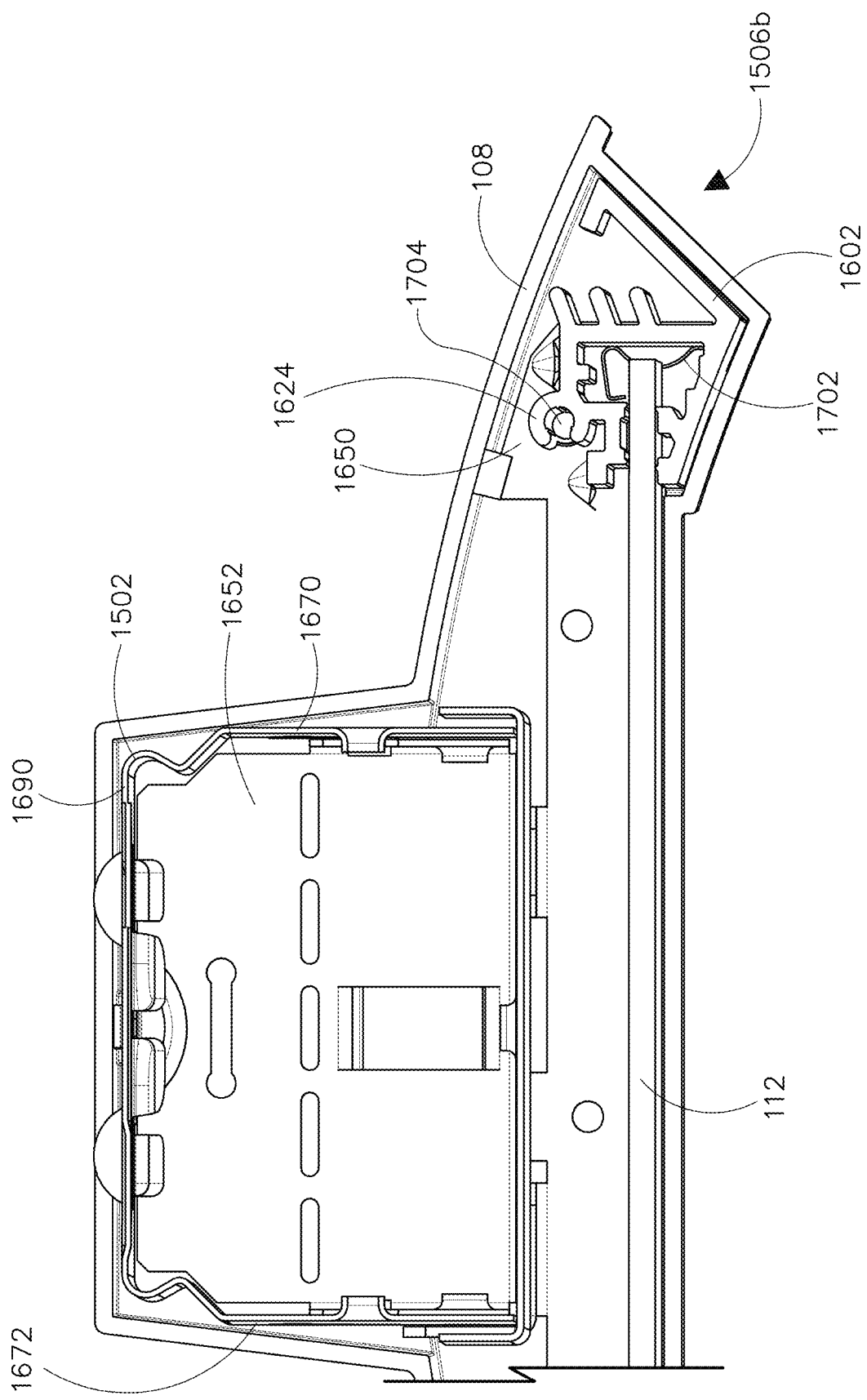
FIG. 17 illustrates an enlarged view of a portion of the cross-section of the horizontal light guide based lighting fixture along an X-Y plane illustrated in FIG. 15, in accordance with example embodiments of the present disclosure.

Turning now to FIGS. 15-17, FIG. 15 illustrates a perspective view of another horizontal light guide based lighting fixture having a quick attachment end plate, in accordance with example embodiments of the present disclosure; FIG. 16 illustrates a cross-sectional view of the horizontal light guide based lighting fixture along an X-Y plane illustrated in FIG. 15, in accordance with example embodiments of the present disclosure; and FIG. 17 illustrates an enlarged view of a portion of the cross-section of the horizontal light guide based lighting fixture along an X-Y plane illustrated in FIG. 15, in accordance with example embodiments of the present disclosure.

Referring to FIGS. 15-17, these figures illustrate another example embodiment of a lighting fixture 1500 that is operable to illuminate an area around the lighting fixture 1500. In particular, the lighting fixture 1500 may include a light engine assembly 1501 that comprises the two side rails 1506a/b (herein referred to as side rails 1506) positioned at opposing longitudinal ends 142, 144 of the lighting fixture 1500 and a light guide 112 disposed at a bottom portion 152 of the lighting fixture 1500 and retained by the two side rails 1506. The light guide 112 may have two long edges (herein 'longitudinal edges') and two short edges (herein 'lateral edges'), each short edge extending from one end of the longitudinal edge to a corresponding end of the other longitudinal edge. Further, each longitudinal edge (or a portion thereof) of the light guide 112 may be securely retained by a respective side rail 1506 of the lighting fixture 1500 as illustrated in FIGS. 16 and 17. The light engine assembly 1501 may further include a plurality of LEDs retained by the side rails 1506a/b and disposed along a longitudinal edge of the light guide 112 as described below in greater detail in association with FIGS. 16 and 17.

Further, the lighting fixture 1500 may include a substantially U-shaped housing bracket 1502 having a top surface 1690 and two side surfaces 1670, 1672 that extend substantially perpendicular from opposite edges of the top surface 1690. However, as described above, one of ordinary skill in the art can understand and appreciate that the housing bracket 1502 may have any other appropriate shape without departing from a broader scope of the present disclosure.

Furthermore, the lighting fixture 1500 may include a base bracket member 1674 that is coupled to a bottom portion of the housing bracket's side panels 1670 and 1672 to form a hollow compartment 1676 at a distance above the light guide 112. The compartment 1676 may have a rectangular cross-sectional shape as illustrated in FIG. 16 and can house various electronic components, wires, and the like, hidden from view when the light fixture 1500 is installed for operation. In other example embodiments, the compartment 1676 can have various other cross-sectional shapes, such as a round or curved shape, and other geometric and non-geometric shapes without departing from a broader scope of the present disclosure.

Additionally, the lighting fixture may include two end caps 108a, 108b (herein referred to as end caps 108) positioned at opposing lateral ends 146, 148 of the lighting fixture 1500. As described above in association with FIGS. 1-14, the end caps 108 may be configured to slide fit, snap fit, or interference fit with the side rails 1506 and/or the housing bracket 1502 such that the end caps 108 overlap and cover at least a portion of the lateral ends of the side rails 1506 and/or the housing bracket 1502.

Referring to FIGS. 16 and 17, each side rail 1506 of the lighting fixture 1500 may include a first side rail member 1602. The first side rail member 1602 may be an elongated member extending from a portion of one end cap 108a or end plate (illustrated in FIGS. 18-26) disposed at one lateral end 146 of the lighting fixture 1500 to a portion of the other end cap 108b or end plate disposed at the opposing lateral end 148 of the lighting fixture 1500. In some example embodiments, the longitudinal length of the first side rail member 1602 may depend upon the length of the longitudinal edge of the light guide 112.

In particular, the first side rail member 1602 may include (i) a C-shaped portion 1624, (ii) a first support arm portion 1696 adjacent the C-shaped portion 1624, (iii) a second support arm portion 1694, (iv) a support wall 1620 extending between the C-shaped portion 1624/the first support arm portion 1696 and the second support arm portion 1694, (v) a wing shaped portion 1692 extending at angle from the support wall in a direction away from the C-shaped portion, the first support arm portion 1696, and the second support arm portion 1694, and (vi) a fin portion 1622 having one or more fins extending from the support wall 1620 in a direction away from the first support arm portion 1696. Even though the first side rail member 1602 is described as having multiple portions, one of ordinary skill in the art can understand and appreciate the first side rail member 1602 is a single piece component where the C-shaped portion 1624, the first support arm portion 1696, the wing shaped portion 1692, the second support arm portion 1694, the support wall 1620, and the fin portion 1622 are integral to the first side rail member 1602 and form the elongated body of the first side rail member 1602.

As illustrated in the example embodiments of FIGS. 16 and 17, the first side rail member 1602 may be configured such that it forms: (i) a first elongated cavity 1698 defined by and in between the first support arm portion 1696 and the second support arm portion 1694 to securely retain a longitudinal edge of the light guide 112, and (ii) a second elongated cavity 1699 adjacent the first elongated cavity 1698 and defined by the first support arm portion 1696, the second support arm portion 1694, and the support wall 1620. The second cavity 1699 may be configured to house a light source of the lighting fixture 1500 or a spring member 1702.

For example, as illustrated in FIGS. 16 and 17, the second cavity 1699 of one of the side rails 1506a may house a second side rail member 1604 having one or more LEDs 1608 disposed thereon while the second cavity 1699 of the other side rail 1506b houses a spring member 1702. The spring member 1702 may be configured to push against the longitudinal edge of the light guide 112 retained in the respective side rail 1506b such that the opposite longitudinal edge of the light guide 112 retained by the other side rail 1506a moves towards the one or more LEDs 1608 to: (i) reduce a gap between the longitudinal edge of the light guide 112 and the one or more LEDs 1608, and (ii) position the longitudinal edge of the light guide 112 in close proximity to/adjacent to the one or more LEDs 1608.

In particular, the one or more LEDs 1608 may be disposed on a circuit board 1606 which in turn is disposed on/attached to a broad surface of the second side rail member 1604. However, in certain examples, the circuit board 1606 and the one or more LEDs 1608 may be disposed directly on the support wall 1620 of the first side rail member 1602 without the second side rail member 1604 as illustrated in FIGS. 4-6.

The second side rail member 1604 may be an elongated and substantially rectangular shaped member that may be defined by the size of the second elongated cavity 1699. The second side rail member 1604 may extend along the length of the second elongated cavity 1699 and may be disposed in the second elongated cavity 1699 such that one broad surface of the second side rail member 1604 faces the support wall 1620 while the opposite broad surface of the second side rail member 1604 faces the longitudinal edge of the light guide 112 retained by the first cavity 1698 of the respective side rail 1506a. The second side rail member 1604 may position the circuit board 1606 attached thereon such that the LEDs 1608 disposed on the circuit board 1604 may be directed towards a longitudinal edge of the light guide 112 retained by the first cavity 1698 of the respective first side rail member 1602.

Figure 27A:
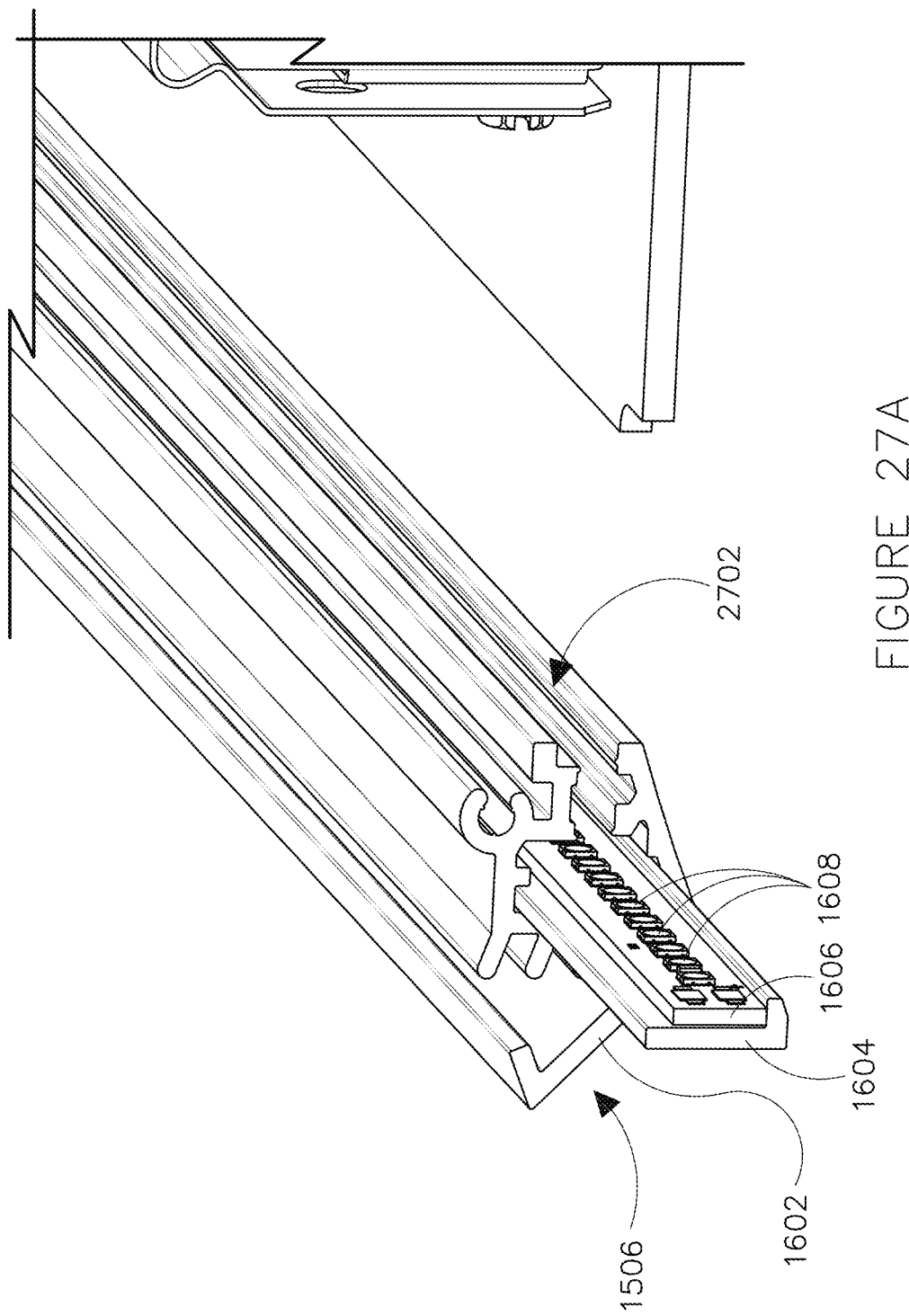
FIGS. 27A and 27B (collectively 'FIG. 27') illustrate a heat sink side rail of the horizontal light guide based lighting fixture illustrated in FIG. 15, in accordance with example embodiments of the present disclosure.
Figure 27B:
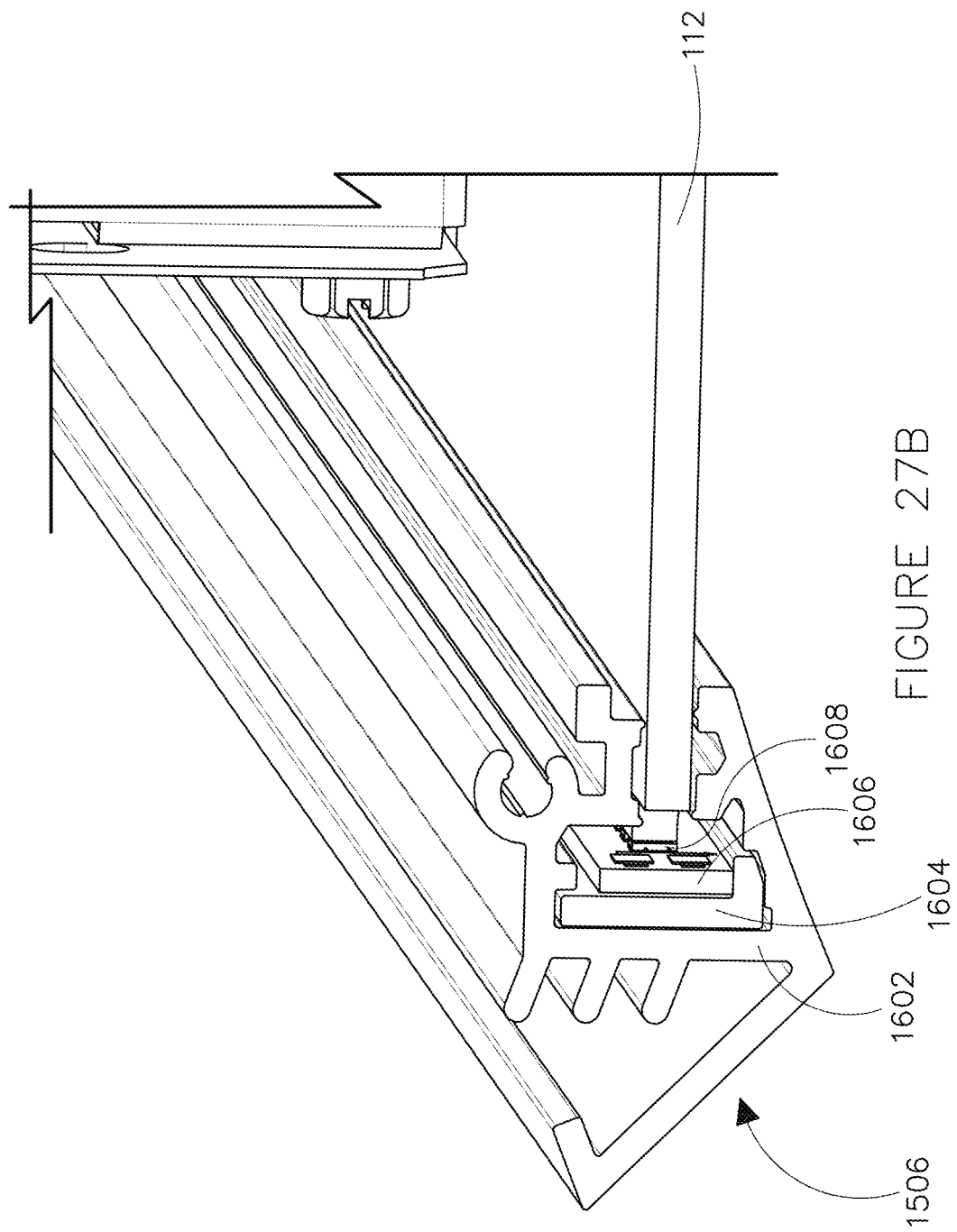

In certain example embodiments, the second side rail member 1604 may be removably coupled to the first side rail member 1602 by sliding the second side rail member 1604 into to the second cavity 1699 of the first side rail member 1602 as illustrated in FIG. 27. However, one of ordinary skill in the art can understand appreciate that any other appropriate coupling mechanisms may be used to removably couple or permanently fix the second side rail member within the second elongated cavity of the first side rail member without departing from a broader scope of the present disclosure. Further, in certain example embodiments, the side rails 1506, i.e., the first side rail member 1602 and/or the second side rail member 1604 may act as a heat sink for the LEDs 1608 and/or the circuit board 1606 by virtue of the LEDs 1608 and/or the circuit board 1606 being positioned on or within the side rails 1506.

Even though FIGS. 16 and 17 illustrate the LEDs 1608 being positioned only along one of the side rails 1506a of the lighting fixture 1500, one of ordinary skill in the art can understand and appreciate that the lighting fixture 1500 can have LEDs 1608 (and/or the second side rail member 1604) positioned on or within both the side rails 1506a and 1506b of the lighting fixture 1500 without departing from a broader scope of the present disclosure.

Further, even though the side rail 1506a is described above as a two-part component (1602, 1604), one of ordinary skill in the art can understand and appreciate that the side rail 106 can be formed as a single piece component without departing from a broader scope of the present disclosure. Further, one of ordinary skill in the art can understand and appreciate that the first side rail member 1602 and the second side rail member 1604 can have any other appropriate shape and size without departing from a broader scope of the present disclosure.

Figure 18:
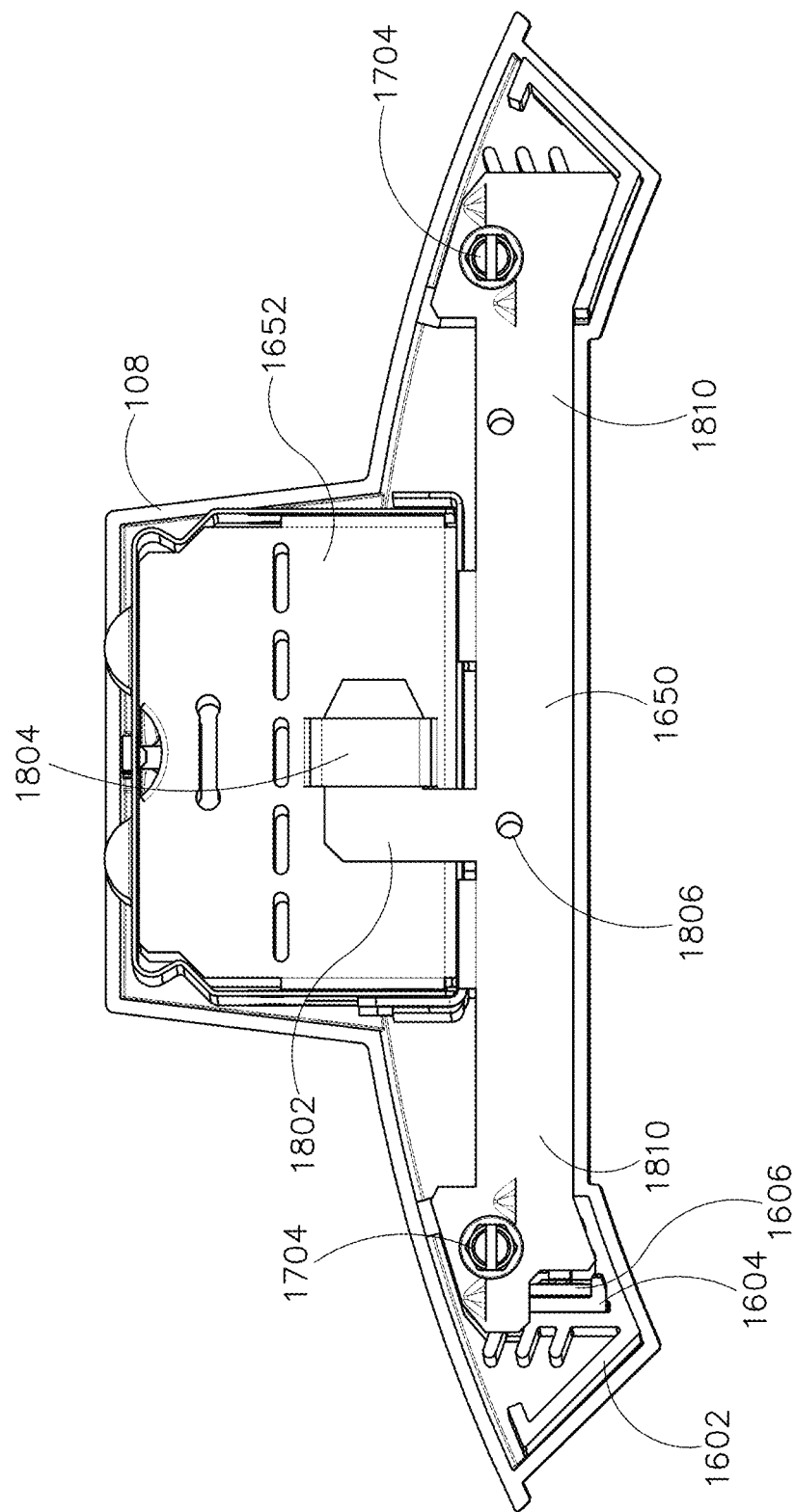
FIG. 18 illustrates a side view of the horizontal light guide based lighting fixture with an end cap being removed to illustrate a coupling of the quick attachment end plate with the horizontal light guide based lighting fixture, in accordance with example embodiments of the present disclosure.
Figure 19:
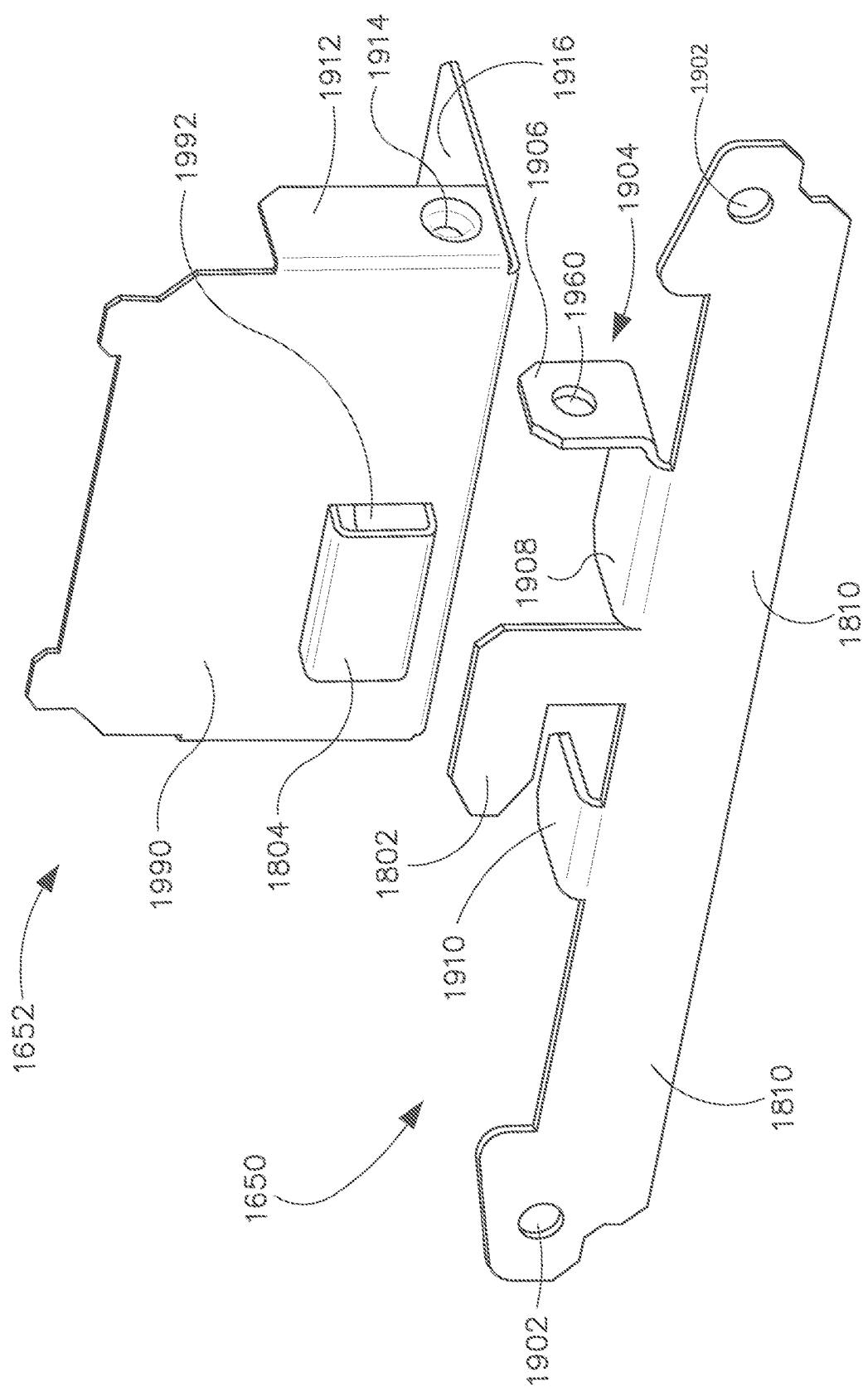
FIG. 19 illustrates a perspective view of the quick attachment end plate of the horizontal light guide based lighting fixture illustrated in FIG. 18, in accordance with example embodiments of the present disclosure.
Figure 20:
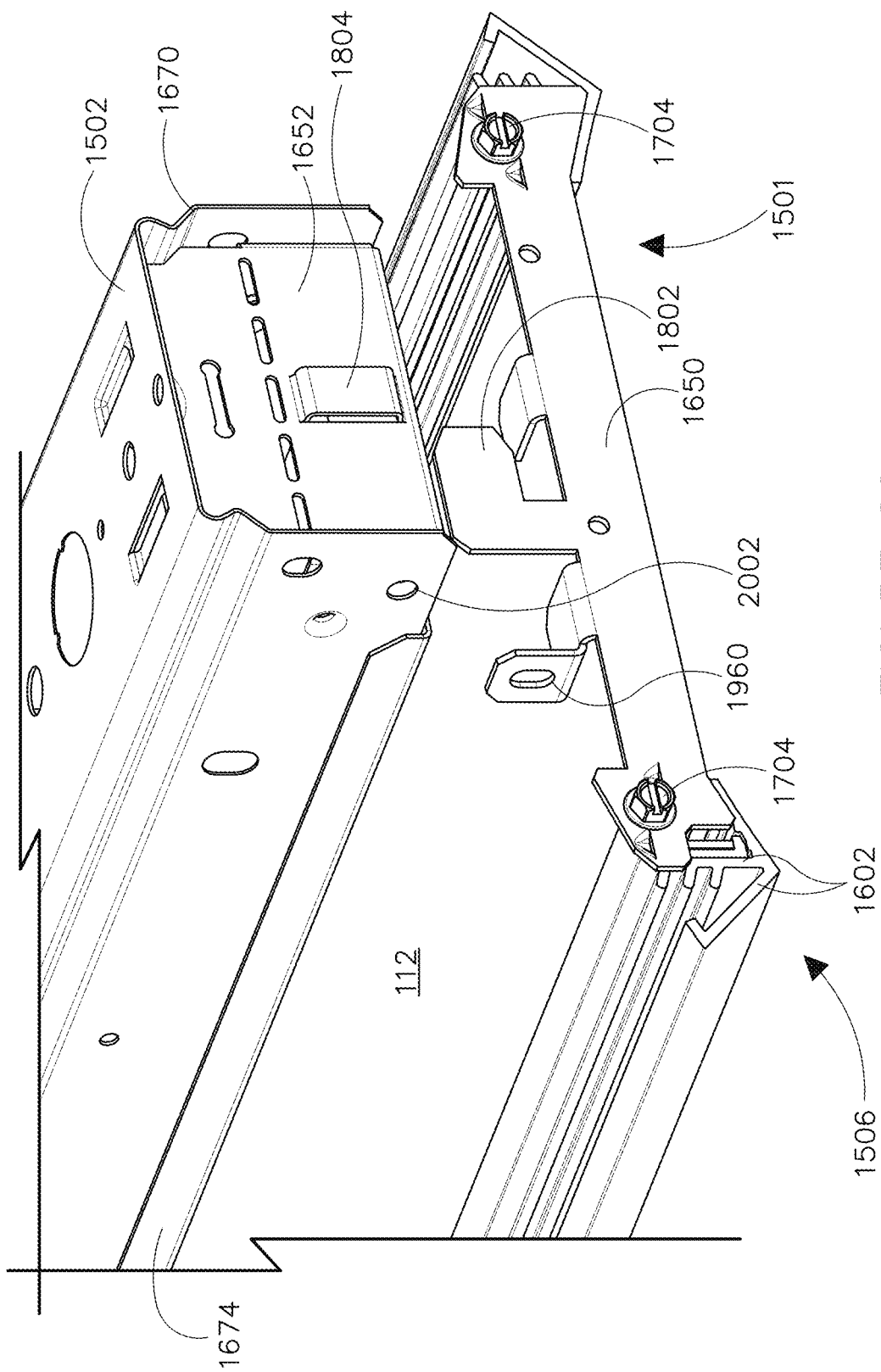
FIGS. 20-22 illustrate the process of coupling the different parts of the quick attachment end plated to each other and to the horizontal light guide based lighting fixture, in accordance with example embodiments of the present disclosure.
Figure 21:
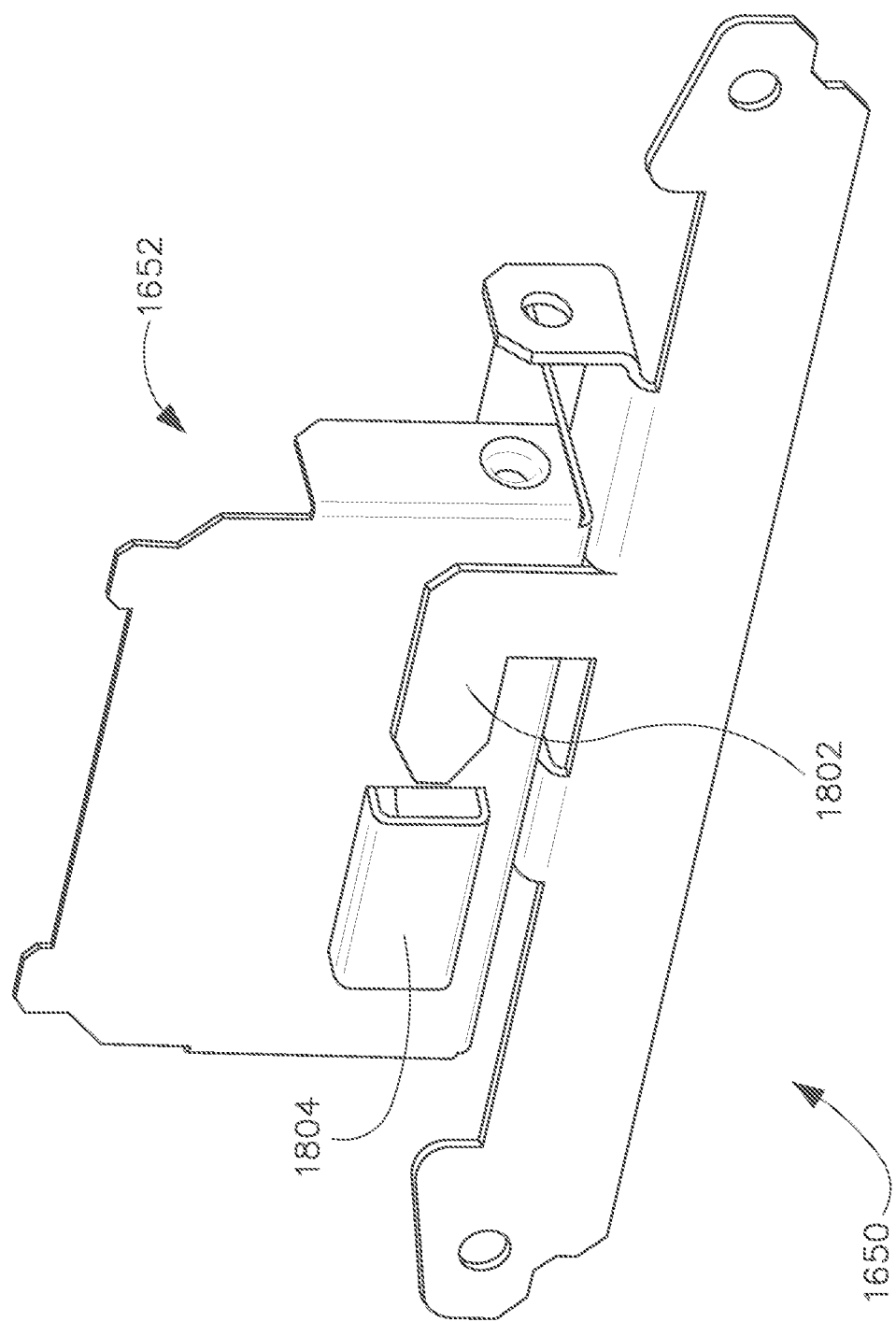
Figure 22:
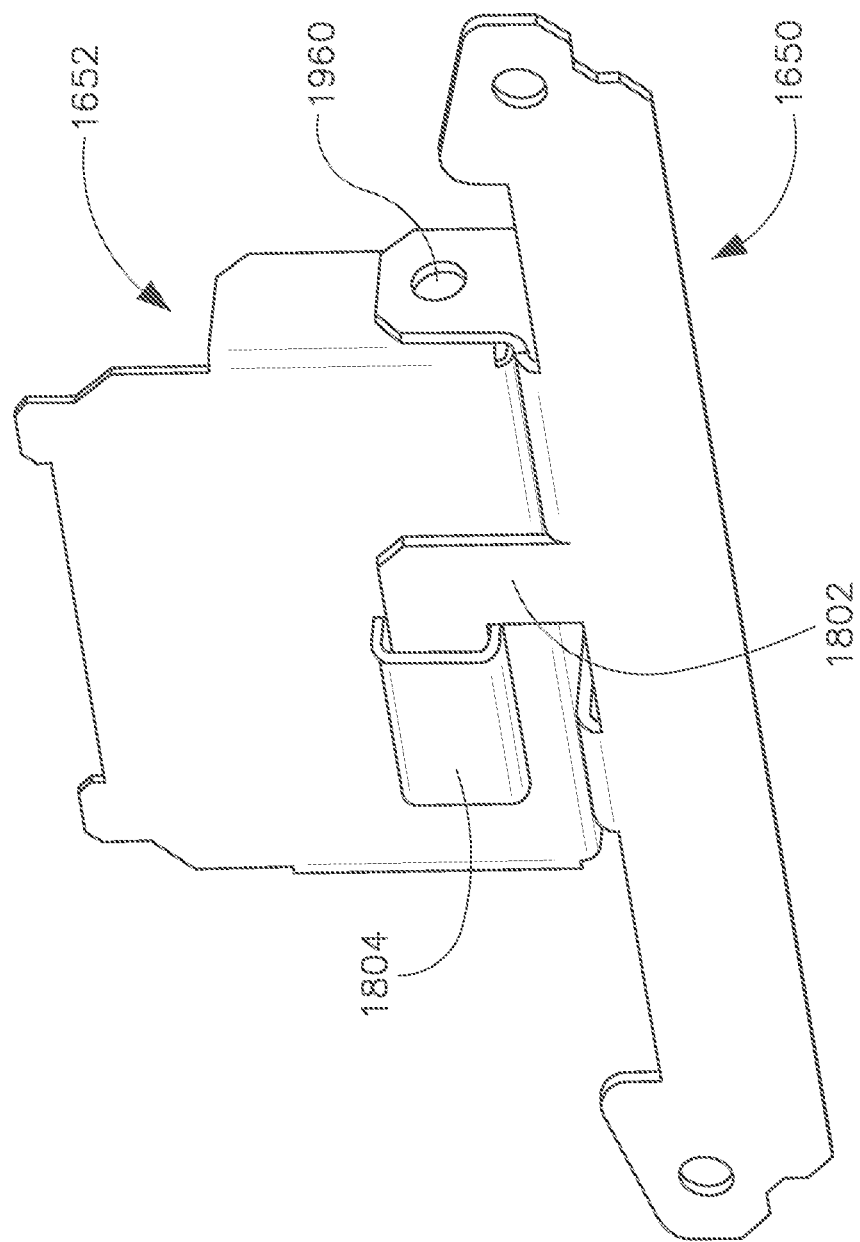
Figure 23:
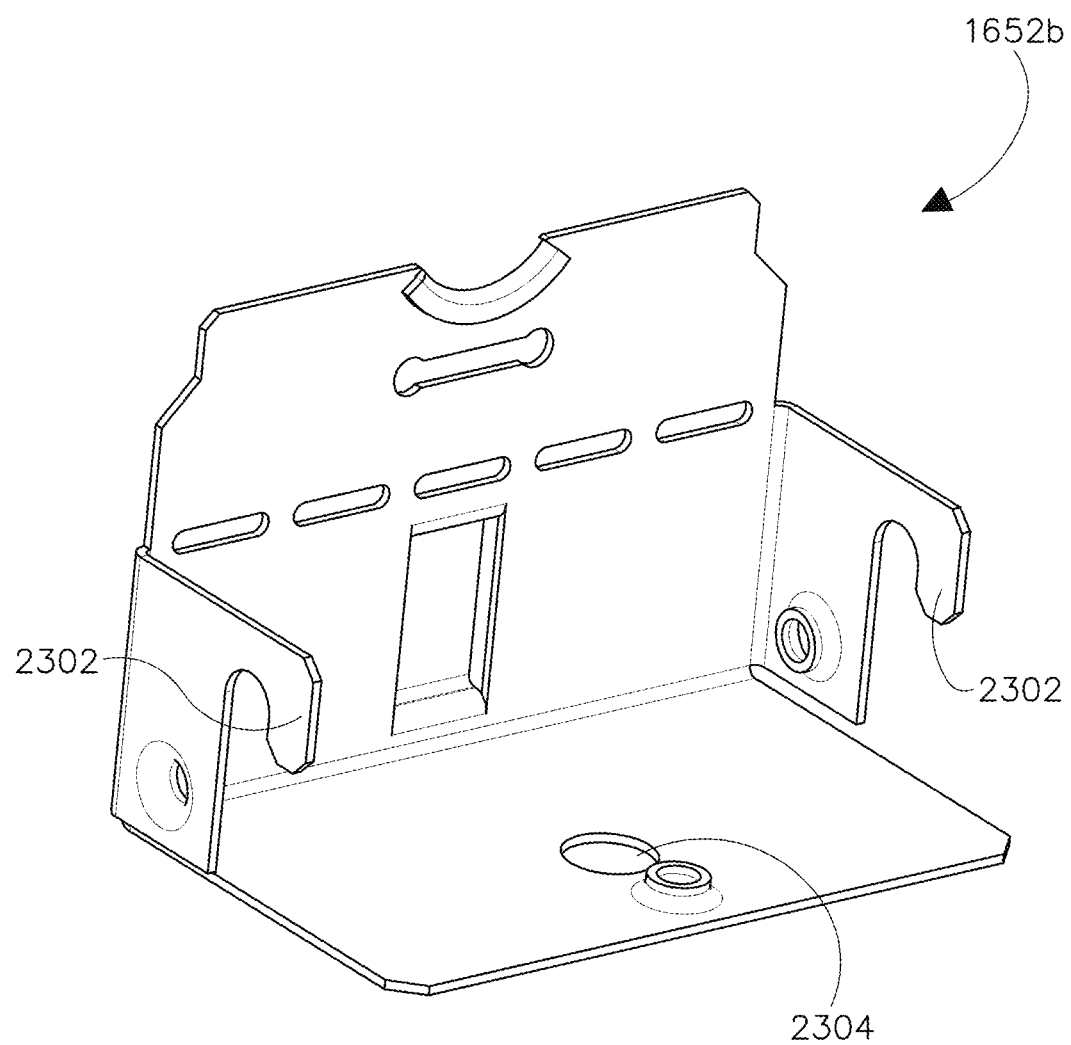
FIG. 23 illustrates another example embodiment of the hook member of the quick attachment end plate, in accordance with example embodiments of the present disclosure.
Figure 24:
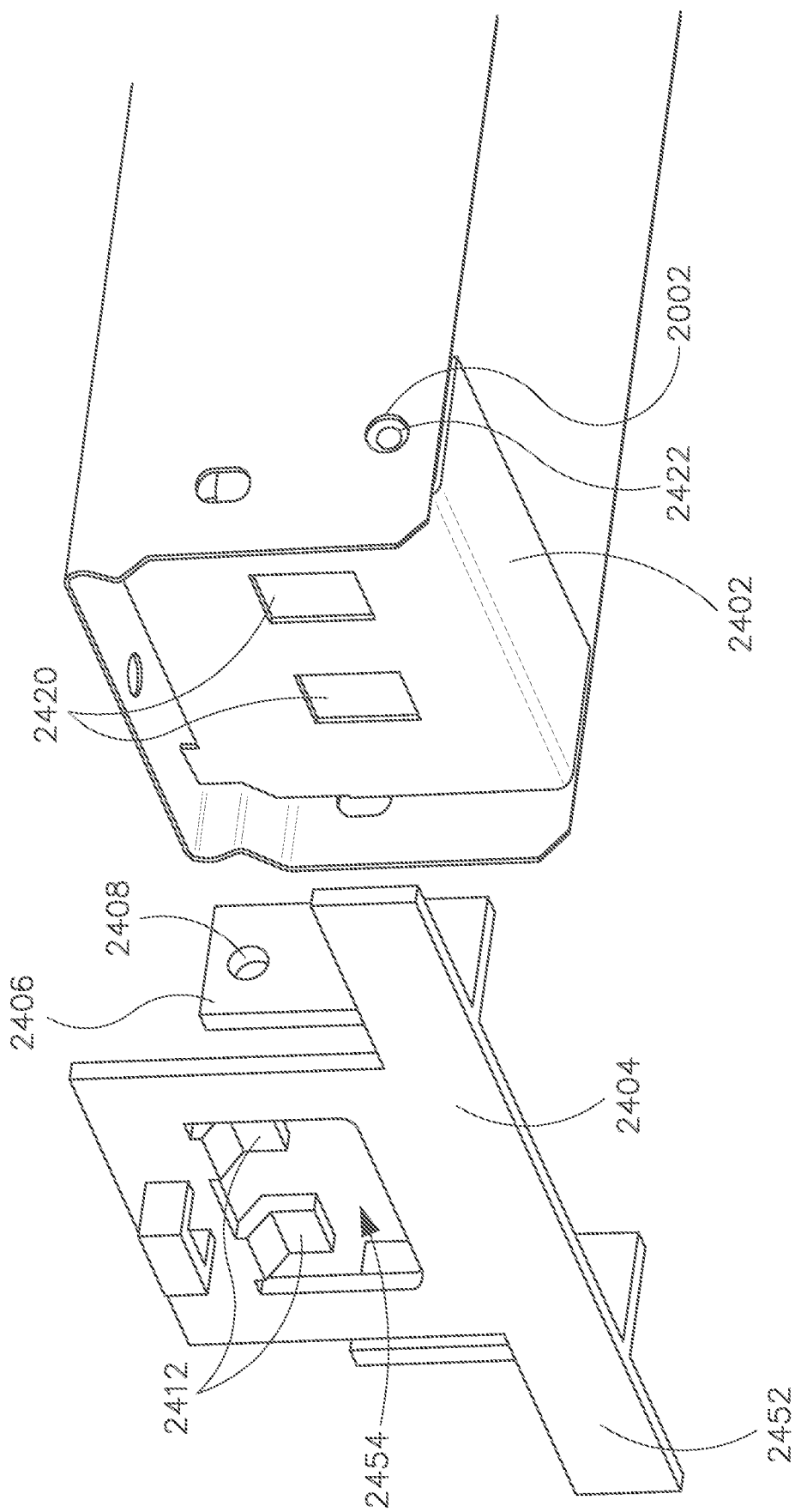
FIGS. 24-26 illustrate the process of coupling the different parts of another example quick attachment end plate to each other and the horizontal light guide based lighting fixture, in accordance with example embodiments of the present disclosure.
Figure 25:
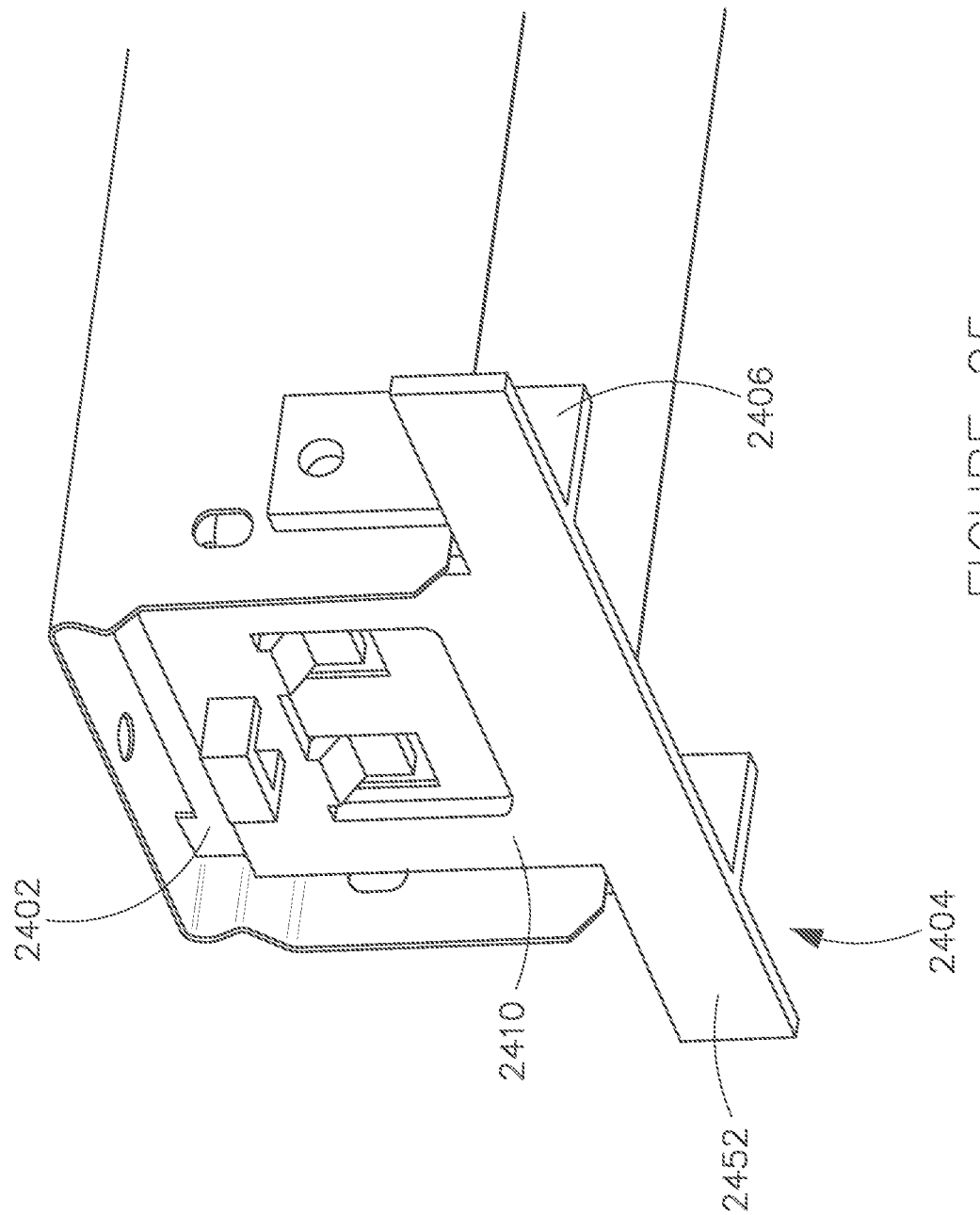
Figure 26:
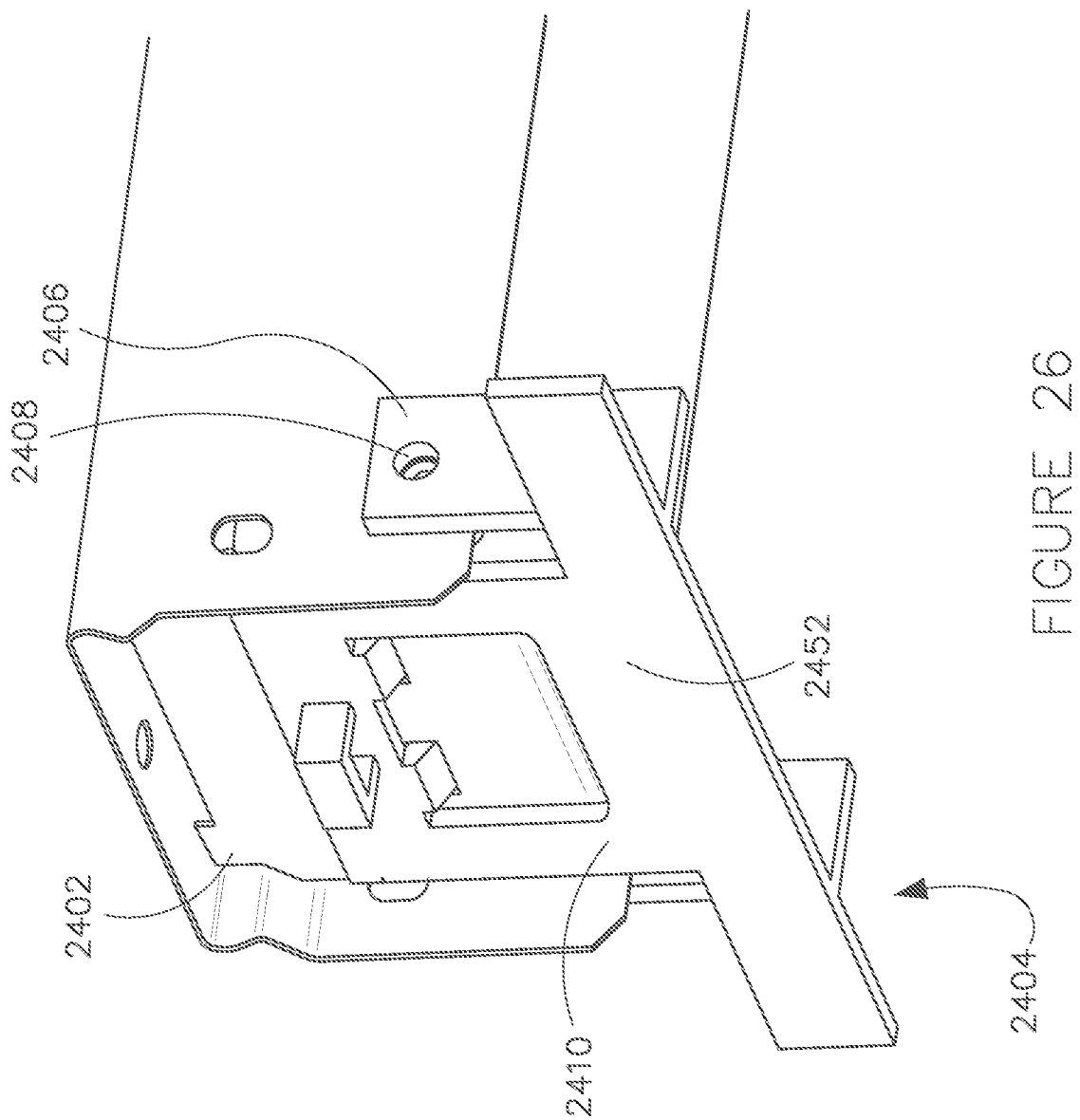

Turning to FIGS. 18-26, these figures illustrate the quick attachment end plates that facilitate the attachment of the light engine assembly 1501, i.e., the side rails, light guide, and the light sources, with the housing bracket 1502 of the lighting fixture 1500. In particular, FIGS. 18-23 illustrate a first example quick attachment end plate, and FIGS. 24-26 illustrate a second example quick attachment end plate. FIG. 18 illustrates a side view of the horizontal light guide based lighting fixture with an end cap being removed to illustrate a coupling of the quick attachment end plate with the horizontal light guide based lighting fixture, in accordance with example embodiments of the present disclosure; FIG. 19 illustrates a perspective view of the quick attachment end plate of the horizontal light guide based lighting fixture illustrated in FIG. 18, in accordance with example embodiments of the present disclosure; FIGS. 20-22 illustrate the steps of how the different parts of the quick attachment end plate are coupled to each other and the horizontal light guide based lighting fixture, in accordance with example embodiments of the present disclosure; and FIG. 23 illustrates another example embodiment of the hook part of the of the quick attachment end plate, in accordance with example embodiments of the present disclosure.

Referring to FIGS. 18-23, the quick attachment end plate may be a two component end plate that includes a hook member 1652 and a tab member 1650 that are configured to attach the light engine assembly 1501 of the lighting fixture 1500 to the housing bracket 1502 of the lighting fixture 1500.

In particular, the hook member 1652 may be attached to the housing bracket 1502 while the tab member 1652 may be attached to the light engine 1501. For example, as illustrated in FIGS. 18-23, the hook member 1652 may include a main body 1990. The main body 1990 may include an aperture 1992 and a substantially U-shaped hook 1804 that protrudes from a perimeter of the aperture 1992. The substantially U-shaped hook 1804 may define a cavity that is open on at least two sides. Further, the hook member 1652 may include may include two side flanges 1912 that extend substantially perpendicular to the main body 1990 from opposite lateral edges of the main body 1990. Each side flange 1912 may include an aperture 1914. Furthermore, the hook member 1652 may include a base flange 1916 that extends substantially perpendicular to the main body 1990 and the side flanges 1912, 1914 from a bottom edge of the main body 1990.

As illustrated in FIGS. 18 and 20, the hook member 1652 may be coupled to the housing bracket 1502 of the lighting fixture 1500 such that (i) the side flanges 1912 of the hook member 1652 may engage the two side surfaces 1670, 1672 of the housing bracket 1502, respectively, and (ii) the aperture of 1914 of each side flange 1912 may align with a respective aperture 2002 of the housing bracket's side surfaces 1670, 1672. Further, a fastener may be passed through the aligned aperture 1914 of one of the side flange 1912 and the aperture 2002 of the corresponding side surface 1670, 1672 in order to couple the hook member 1652 to the housing bracket 1502.

Even though FIGS. 19, 21, and 22 illustrate a hook member 1652 having a specific shape, one of ordinary skill in the art can understand and appreciate that the hook member may have any other appropriate shape without departing from a broader scope of the present disclosure. For example, FIG. 23 illustrates another example hook member 1652b. In particular, the hook member 1652b may be substantially similar in shape to the hook member 1652 of FIGS. 19, 21, and 22 except for the arms 2302 extending from the side flanges 1912 that provide additional support and coupling points for coupling the hook member 1652 to the housing bracket 1502 of the lighting fixture 1500. Further, FIG. 23 illustrates an aperture 2304 on the base flange 1916 of the hook member 1652b that may be aligned with a corresponding aperture on the base bracket member 1674 of the lighting fixture 1500 to couple the hook member 1652b to the base bracket member 1674 of the lighting fixture 1500.

Referring to FIG. 19, the tab member 1650 may include an elongated flange at a bottom portion of the tab member 1650. The elongated flange may include two arms 1810 extending in opposite directions. Each arm of elongated flange 1810 may include an aperture 1902 positioned at an end of the respective arm 1810. Further, the tab member 1650 may include a substantially L-shaped tab 1802 extending along a plane of the elongated flange 1810 and having a first leg and a second leg that are substantially perpendicular to each other. Furthermore, the tab member 1650 may include a first flange 1910 extending substantially perpendicular to a plane of the elongated flange arm's 1810 and/or the tab 1802. In particular, the first flange 1910 extends from a top edge of one of the elongated flange and is positioned on a first side of the tab 1802. Additionally, the tab member 1650 may include a second flange 1904 that has a base surface 1908 that extends substantially perpendicular to a plane of the elongated flange and/or the tab 1802. The base surface 1908 of the second flange 1904 may be substantially parallel to the first flange 1910. Further, the second flange 1904 may include a side surface 1906 that extends substantially perpendicular to the base surface 1908 from an edge of the base surface 1908 as illustrated in FIGS. 19 and 20. The side surface 1906 of the second flange 1904 may include an aperture 1960. Furthermore, the second flange 1904 extends from a top edge of one of the elongated flanges 1810 and is positioned on a second side of the tab 1802 that is opposite to the first side of the tab 1802 having the first flange 1910.

As illustrated in FIGS. 18 and 20, the tab member 1650 may be coupled to the light engine 1501. In particular, tab member 1650 may be placed against/adjacent to a lateral end of the light engine 1501 such that the aperture 1902 of each elongated flange arm 1810 may be axially aligned with a cavity defined by the C-shaped portion 1624 of the respective side rails 1506. Further, to couple the tab member 1650 to the light engine 1501, a fastener 1704 may be passed through each axially aligned aperture 1902 of the elongated flange arm 1810 and the cavity defined by the C-shaped portion 1624 of the respective side rails 1506a/b. As illustrated in FIG. 20, the tab member 1650 may hold the light engine assembly 1501 together by coupling the tab member 1650 to the side rails 1506a/b of the light engine 1501.

Once the tab member 1650 is coupled to the light engine 1501 and the hook member 1652 is coupled to the housing bracket 1502, the light engine 1501 is coupled/attached to the housing bracket 1502 by coupling the tab member 1650 to the hook member 1652 using a slide in motion as illustrated in FIGS. 21 and 22. In particular, as illustrated in FIG. 21, the tab member 1650 and the light engine 1501 (by virtue of being coupled to the tab member 1501) may be pushed up against the hook member 1652 coupled to the housing bracket 1502. In this step, the first flange 1910 and/or the base surface 1908 of the second flange 1904 of the tab member 1650 may engage the bottom flange 1916 of the hook member 1652, thus, preventing a further upward movement of the tab member 1650 and the light engine 1501. Further, in said step, the tab 1802 (substantially L-shaped flange) of the tab member 1650 may be positioned adjacent the main body 1990 of the hook member 1652 such that second leg of the tab 1802 is in position to slide into the cavity defined by the hook 1804. Subsequently, as illustrated in FIG. 22, the second leg of the tab 1802 is slid into the cavity formed by the hook 1804 to engage the tab member 1650 with the hook member 1652 which in turn engages the light engine 1501 with the housing bracket 1502 of the lighting fixture 1500. Once the second leg of the tab 1802 is slid into the cavity formed by the hook 1804, the aperture 1960 of the tab member's second flange 1904 may be aligned with the aperture 2002 of the housing bracket 1502 and the aperture 1914 the hook member's side flange 1912. Further, a fastener is passed through the aligned apertures (1904, 2002, and 1914) of the tab member 1650, the housing bracket 1502, and the hook member 1652 to lock the engaged tab member 1650 and hook member 1652 in position.

Similarly, the tab member 1650 may be disengaged from the hook member 1652 by (i) removing the fastener passing through the aligned apertures (1904, 2002, and 1914) of the tab member 1650, the housing bracket 1502, and the hook member 1652, and (ii) sliding out the tab 1802 from the cavity formed by the hook 1804. Disengaging the tab member 1650 form the hook member 1652 may in turn disengage the light engine 1501 from the housing bracket 1502 of the lighting fixture 1500. Thus, in the field, the quick attachment end plates may aid a user to quickly and easily engage and/or disengage light engines 1501 and the housing bracket 1502. For example, the quick attachment end plates allow easy replacement of light engines 1501 in an already installed housing bracket 1502. That is, when the housing bracket 1502 of the lighting fixture 1500 is mounted on a surface (wall mount, surface mount, suspend mount, etc.) and the light engine 1501 needs to be replaced, a user can disengage the tab member 1650 (attached to the light engine 1501) from the hook member 1652 in order to disengage the light engine 1501 from the housing bracket 1502 and attach another/new light engine 1501 to the lighting fixture 1500 using the quick attachment end plates.

Even though FIGS. 18-23 illustrate an example quick attachment end plate having a specific shape, structure, and engagement/disengagement mechanism, one of ordinary skill in the art can understand and appreciate that the quick attachment plate can have any other appropriate shape, structure, and/or engagement/disengagement mechanism without departing from a broader scope of the present disclosure. For example, FIGS. 24-26 illustrate another example quick attachment end plate having a shape, structure, and engagement mechanism that is different from the quick attachment end plate illustrated in FIGS. 18-23.

Referring to FIGS. 24-26, the quick attachment end plate may include a first member 2402 that is configured to be coupled to the housing bracket 1502 and a second member 2404 that is configured to be coupled to the light engine 1501. Further, as described above in association with FIGS. 18-23, the first member 2402 and the second member 2404 may be configured to removably couple the light engine 1501 to the housing bracket 1502 of the lighting fixture 1500. In particular, the first member 2402 illustrated in FIGS. 24-26 may be substantially similar to the hook member 1652 illustrated in FIGS. 18-23 except that the first member 2402 may include two slots 2420 and no hook feature.

In order to couple the first member 2402 with the housing bracket 1502, the first member 2402 may be positioned within the housing bracket 1502 such that the side flanges of the first member 2402 engages an inner portion of the housing bracket's side surfaces 1670, 1672 and the aperture 2422 of the side flanges are aligned with the respective apertures 2002 of the housing bracket's side surfaces 1670, 1672. Responsively, a fastener may be passed through one set of aligned apertures (2422, 2002) on one side to couple the first member 2402 with the housing bracket 1502.

Further, referring to FIG. 24, the second member 2404 may include a main body 2410 and a bottom flange 2452 that extends in opposite directions beyond a width of the main body 2410. Further, the second member 2404 may include an aperture 2454 that is defined by the main body 2410 and the bottom flange 2452. Furthermore, the second member 2404 may include two angled tabs 2412 that extend out from a top edge of the aperture 2454 and opposite to the bottom flange 2452 as illustrated in FIG. 24. In particular, the tabs 2412 may be designed and shaped to engage and be securely retained by the respective slots 2420 of the first member 2402 as illustrated in FIGS. 25-26. Additionally, the second member 2404 may include side flanges 2408 on either side of the main body 2410. The side flanges 2408 may be substantially L-shaped flanges that extend substantially perpendicular to the main body 2410 and/or the bottom flange 2452. Further, each long leg of the L-shaped side flanges 2408 may include an aperture 2406. As described above, the second member 2402 may be coupled to the light engine 1501, i.e., the side rails 1506a/b using a fastener or any other appropriate coupling mechanism.

Once the second member 2404 is coupled to the light engine 1501 and the first member 2402 is coupled to the housing bracket 1502, the light engine 1501 may be coupled to the housing bracket 1502 of the lighting fixture 1500 by coupling the first member 2402 to the second member 2404 as illustrated in FIGS. 25 and 26. In particular, each angled tab 2412 of the second member 2404 may be inserted into the respective slots 2420 of the first member 2402. Further, the side flanges 2406 of the second member may engage an outer portion of the housing bracket's side surfaces 1670, 1672 as illustrated in FIG. 25. Subsequently, the second member 2404 may slide downwards till (i) a portion of the second member's angled tabs 2412 engages a perimeter of the first member's respective slots 2420 and (ii) the aperture 2408 of the second member's side flanges 2406 are aligned with the aperture 2002 of the housing bracket's side surfaces 1670, 1672 and the aperture 2422 of the first member's side flanges. Further, a fastener may be passed through the aligned apertures (2408, 2002, and 2422) of the second member 2404, the housing bracket 1502, and the first member 2402, respectively to lock the second member 2404, the housing bracket 1502, and the first member 2402 in place.

As described above in association with FIGS. 18-23, the light engine 1501 may be disengaged from the housing bracket 1502 of the lighting fixture by disengaging the second member 2404 from the first member 2422. For example, the fasteners passing through the aligned apertures of the second member 2404, the housing bracket 1502, and the first member 2402 may be removed and subsequently, the second member 2404 may be disengaged from first member 2402.

Lighting Fixtures of Variable Lengths

Figure 28:
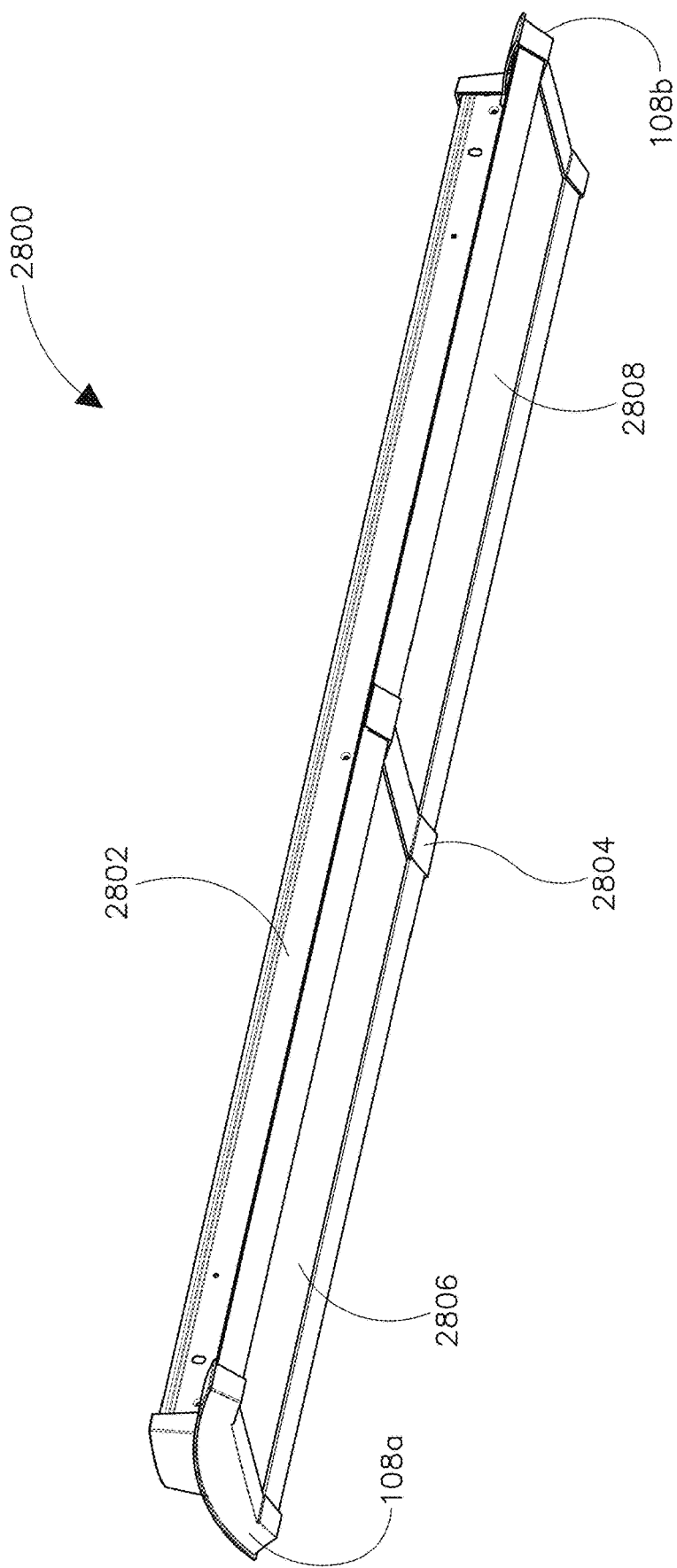
FIGS. 28-29 illustrate perspective views of multiple horizontal light guide based lighting fixtures linked together, in accordance with example embodiments of the present disclosure.
Figure 29:
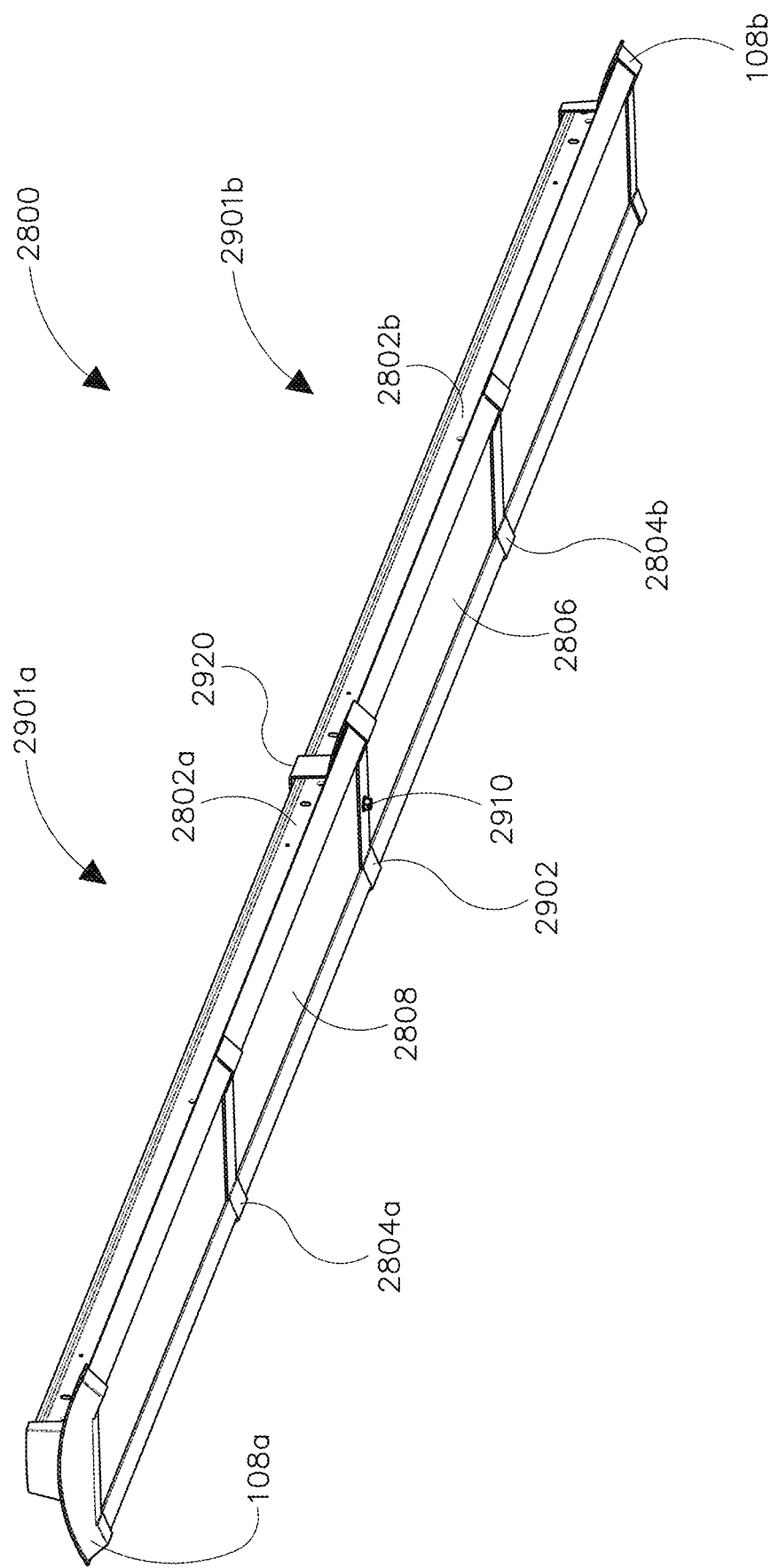

The lighting fixtures 100 and 1500 of the present disclosure can be row mounted with multiple fixtures end to end to form longer stretches of lighting fixtures as illustrated in FIGS. 28 and 29. For example, FIG. 28 illustrates a lighting fixture 2800 with one integral housing bracket 2802 and two light guides 2806, 2808 (or two light engines) joined together, in accordance with example embodiments of the present disclosure. The two light guides 2806, 2808 are both coupled to the same housing channel 2802 which extends across the combined length of the two light guides 2806, 2808. In said example embodiment of FIG. 28, the lighting fixture 2800 includes a light guide spacer 2804 that is configured to link the two light guides 2806, 2808 together and reduce a gap between the two light guides 2806, 2808. In particular, the light guide spacer 2804 may be shaped substantially similar to the shape of the latitudinal/lateral edges of the light engines, i.e., the light guides 2806, 2808 and the side rails 1506 and may be configured to overlap the respective edges of the two light engines. That is, the light guide spacer 2804 may be configured to receive and secure a latitudinal edge of a first light guide 2806 on a first side of the light guide spacer 2804 and receive and secure a latitudinal edge of the second light guide 2808 on a second side of the light guide spacer 2804, to join and align the light guides 2806, 2808 together and cover a gap formed between the light guides 2806, 2808 when the first light engine and the second light engine are coupled to the housing bracket 2802.

In another example embodiment, two lighting fixtures 100/1500/2802 may be coupled to each other at their lateral ends as illustrated in FIG. 29. In particular, FIG. 29 illustrates a perspective view of two lighting fixtures 2901a, 2901b linked together in an assembly 2900, in accordance with example embodiments of the present disclosure. The housing brackets 2802a, 2802b of the respective light fixtures 2901a, 2901b are joined together at their lateral ends, i.e., the open lateral ends that are configured to receive the end caps 108. In certain example embodiments, a bridge 2920 and light guide spacer 2902 are disposed at the junction of the lighting fixtures 2901a, 2901b. In particular, the end cap 108 on one end of each lighting fixture 2901a/2901b may be removed and the bridge 2920 and light guide spacer 2902 may be coupled to the respective open lateral ends (lateral ends without the end cap 108) in order to link the two lighting fixtures 2901a and 2901b together.

Figure 30:
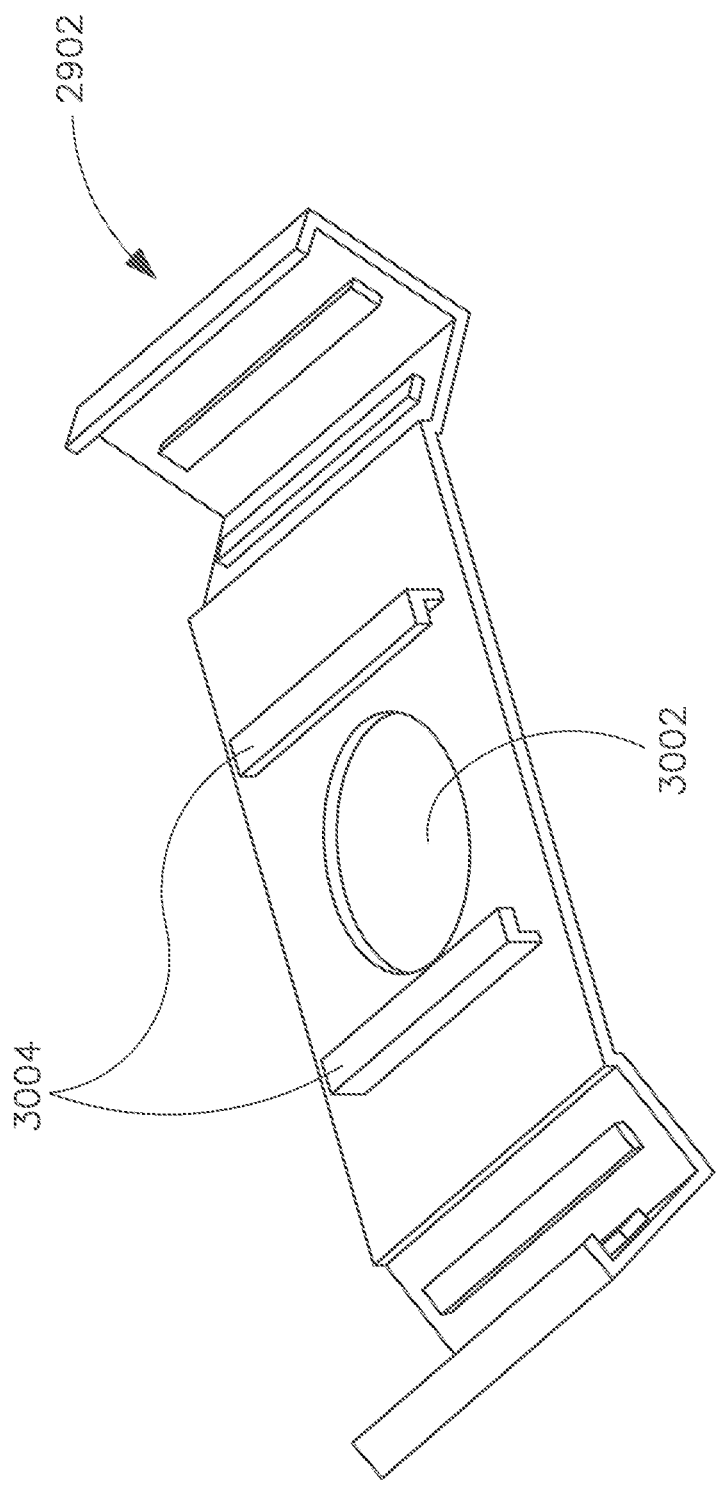
FIG. 30 illustrates a perspective view of a spacer element capable of housing an electronic component as illustrated in FIG. 29, in accordance with example embodiments of the present disclosure.

The bridge 2920 may be shaped substantially similar to the shape of the housing brackets 2802a/2802b such that the bridge 2920 receives and couples the open lateral end of each lighting fixture's housing bracket using fasteners or other appropriate coupling mechanisms. In particular, the bridge 2920 receives the open lateral end of the first lighting fixture's housing bracket 2802a on one side and the second lighting fixture's housing bracket 2802b on an opposite side of the bridge 2920. The bridge 2920 may be configured to bridge/cover the gap between the housing brackets 2802a and 2802b when the first lighting fixture 2901a is coupled to the second lighting fixture 2901b at their lateral ends. Further, as described above in association with FIG. 28, the light guide spacer 2902 may be shaped substantially similar to the shape of the latitudinal edges of the light engine and may be configured to overlap the respective edges of the side rails 1506 and the two light guides 2808 and 2806. That is, the light guide spacer 2902 may be configured to receive and secure a latitudinal edge of the first light engine of the first lighting fixture 2901a and the second light engine of the second lighting fixture 2901b, to join and align the respective light guides 2806 and 2808 together and cover a gap formed between the light guides when the first lighting fixture 2901a is coupled to the second lighting fixture 2901b as illustrated in FIG. 29. In addition, as illustrated in greater detail in FIG. 30, the light guide spacer 2902 may include an aperture 3002 and flanges 3004 positioned on one or more sides of the aperture 3002 to receive and securely retain an electronic component 2910, such as a motion sensor. A portion of the electronic component 2910, e.g., lens of the motion sensor may extend through the aperture 3002 while the remainder portion of the electronic component 2910, e.g., body of the motion sensor may remain behind the aperture 3002 hidden from a user's view when installed as illustrated in FIG. 29.

Furthermore, the bridge 2920 and/or the light guide spacer 2902 may be fully opaque, partially opaque, or clear. In certain example embodiments, the bridge 2920 and/or the light guide spacer 2902 may be formed using polymer material; however, in other example embodiments, any other appropriate material may be used without departing from a broader scope of the present disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A lighting fixture comprising:
an elongated housing enclosing an electrical component;
a first side rail positioned adjacent a first side of the elongated housing and a second side rail positioned adjacent a second side of the elongated housing;
a light guide positioned below the elongated housing, wherein a top major surface of the light guide faces the elongated housing, a first longitudinal edge of the light guide is disposed in the first side rail, and a second longitudinal edge of the light guide is disposed in the second side rail;
a plurality of light emitting diodes (LEDs) positioned within the first side rail and adjacent the first longitudinal edge of the light guide;
a first end cap comprising a first outer curved portion and a first inner portion that receives a first end of the light guide;
a second end cap comprising a second outer curved portion and a second inner portion fix receiving a second end of the light guide; and
wherein the first inner portion of the first end cap receives a first end of the first side rail and a first end of the second side rail, and wherein the second inner portion of the second end cap receives a second end of the first side rail and a second end of the second side rail.

2. The lighting fixture of claim 1, further comprising:
a first end plate disposed between the first end cap and the first end of the light guide; and
a second end plate disposed between the second end cap and the second end of the light guide.

3. The lighting fixture of claim 1, further comprising:
a first end plate attached to a first end of the elongated housing and disposed between the first end cap and the first end of the light guide; and
a second end plate attached to a second end of the elongated housing and disposed between the second end cap and the second end of the light guide.

4. The lighting fixture of claim 1, further comprising:
a first end plate attached to the first side rail and the second side rail, the first end plate disposed between the first end cap and the first end of the light guide; and a second end plate attached to the first side rail and the second side rail, the second end plate disposed between the second end cap and the second end of the light guide.

5. The lighting fixture of claim 1, wherein the first end cap is configured to house a motion sensor.

6. The lighting fixture of claim 1, wherein each of the first side rail and the second side rail comprises:
a first side rail member; and
a second side rail member that is coupled to the first side rail member using a fastener such that an elongated space is formed between the first side rail member and the second side rail member.

7. The light fixture of claim 6, wherein the plurality of light emitting diodes are attached to the first side rail member of the first side rail.

8. The lighting fixture of claim 1, wherein each of the first side rail and the second side rail comprises:
a first side rail member; and
a second side rail member that slides within the first side rail member.

9. The lighting fixture of claim 1, wherein the first side rail comprises a heat sink.

10. The lighting fixture of claim 1, further comprising at least one reflector adjacent the top major surface of the light guide.

11. The lighting fixture of claim 1, further comprising:
a first reflector disposed on the first side of the elongated housing and adjacent the top major surface of the light guide; and
a second reflector disposed on the second side of the elongated housing and adjacent the top major surface of the light guide.

12. The lighting fixture of claim 1, wherein the first inner portion of the first end cap comprises a first flat surface for receiving the first end of the light guide and the second inner portion of the second end cap comprises a second flat surface for receiving the second end of the light guide.

13. The lighting fixture of claim 1, wherein the first end cap covers a first end of the elongated housing, and wherein the second end cap covers a second end of the elongated housing.

14. A lighting fixture comprising:
an elongated housing;
a light engine comprising:
a first side rail positioned adjacent a first side of the elongated housing;
a second side rail position adjacent a second side of the elongated housing;
a light guide positioned below the elongated housing, wherein a top major surface of the light guide faces the elongated housing, a first longitudinal edge of the light guide is disposed in the first side rail, and a second longitudinal edge of the light guide is disposed in the second side rail;
a plurality of light emitting diodes (LEDs) positioned within the first side rail and adjacent the first longitudinal edge of the light guide;
a first end cap attached to a first end of the lighting fixture, the first end cap comprising a first outer curved portion and a first inner portion;
a second end cap attached to a second end of the lighting fixture, the second end cap comprising a second outer curved portion and a second inner portion; and wherein the first inner portion of the first end cap receives a first end of the first side rail and a first end of the second side rail, and wherein the second inner portion of the second end cap receives a second end of the first side rail and a second end of the second side rail.

15. The lighting fixture of claim 14, further comprising a spring member disposed in the second side rail member, the spring member biasing the first longitudinal edge of the light guide towards the plurality of LEDs.

16. The lighting fixture of claim 14, wherein the first end cap is configured to house an emergency test switch.

17. The lighting fixture of claim 14, wherein the first inner portion of the first end cap comprises a first flat surface for receiving a first end of the light guide and the second inner portion of the second end cap comprises a second flat surface for receiving a second end of the light guide.

18. The lighting fixture of claim 14, further comprising:
a first reflector disposed on the first side of the elongated housing and adjacent the top major surface of the light guide; and
a second reflector disposed on the second side of the elongated housing and adjacent the top major surface of the light guide.

19. The lighting fixture of claim 14, wherein each of the first side rail and the second side rail comprises:
a first side rail member; and
a second side rail member that is coupled to the first side rail member using a fastener such that an elongated space is formed between the first side rail member and the second side rail member.

* * * * *